US011340769B2

(12) United States Patent
Masterson et al.

(10) Patent No.: US 11,340,769 B2
(45) Date of Patent: May 24, 2022

(54) GENERATING CONTENT ITEMS OUT OF AN ELECTRONIC COMMUNICATION WORKFLOW

(71) Applicant: Microsoft Technology Licensing, LLC, Redmond, WA (US)

(72) Inventors: Joseph Masterson, Maple Valley, WA (US); Jeremy de Souza, Bellevue, WA (US); Jin Ma, Redmond, WA (US); Elena Catrinescu, Woodinville, WA (US); Nathan Waddoups, Redmond, WA (US); Kenneth Fern, Bellevue, WA (US); David Paul Limont, Seattle, WA (US); David Lloyd Meyers, Jr., Seattle, WA (US); Michael B. Palmer, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 14/497,281

(22) Filed: Sep. 25, 2014

(65) Prior Publication Data
US 2015/0281150 A1    Oct. 1, 2015

Related U.S. Application Data

(60) Provisional application No. 61/973,139, filed on Mar. 31, 2014.

(51) Int. Cl.
*G06F 3/04847* (2022.01)
*G06F 16/22* (2019.01)
(Continued)

(52) U.S. Cl.
CPC ...... *G06F 3/04847* (2013.01); *G06F 3/04842* (2013.01); *G06F 16/22* (2019.01);
(Continued)

(58) Field of Classification Search
None
See application file for complete search history.

(56) References Cited

U.S. PATENT DOCUMENTS 5,818,447 A * 10/1998 Wolf .................... G06Q 10/107
715/752
6,088,696 A    7/2000 Moon et al.
(Continued)

FOREIGN PATENT DOCUMENTS

CN    1577279 A    2/2005
CN    1722711 A    1/2006
(Continued)

OTHER PUBLICATIONS

"Second Written Opinion Issued in PCT Application No. PCT/US2015/022612", dated Dec. 4, 2015, 6 Pages.
(Continued)

*Primary Examiner* — Lance Leonard Barry
*Assistant Examiner* — Mohammad Yousuf A. Mian
(74) *Attorney, Agent, or Firm* — Liang IP, PLLC

(57) ABSTRACT

Inline document collaboration workflows are provided. When a user receives an electronic communication that includes an attached content item, the receiving user may select the attached content item and cause the attached content item to be displayed in an immersive view in proximity to an electronic communication pane in which an electronic communication may be conducted about any topic including the content item that is displayed in proximity to the electronic communication pane. During editing of a content item, an electronic communication may be generated from a user interface in which the content item is being generated, or alternatively a new content item may be generated out of an electronic communications user interface.

20 Claims, 19 Drawing Sheets

(51) Int. Cl.
*G06F 16/24* (2019.01)
*G06Q 10/10* (2012.01)
*H04L 51/08* (2022.01)
*H04L 67/10* (2022.01)
*G06F 3/04842* (2022.01)

(52) U.S. Cl.
CPC .............. *G06F 16/24* (2019.01); *G06Q 10/10* (2013.01); *H04L 51/08* (2013.01); *H04L 67/10* (2013.01); *G06Q 10/107* (2013.01)

(56) References Cited

U.S. PATENT DOCUMENTS

| | | |
|---|---|---|
| 6,304,898 B1 | 10/2001 | Shiigi |
| 7,076,730 B1 | 7/2006 | Baker |
| 7,130,885 B2 | 10/2006 | Chandra et al. |
| 7,243,298 B2 | 7/2007 | Yozell-Epstein et al. |
| 7,424,676 B1 | 9/2008 | Carlson et al. |
| 7,437,421 B2 | 10/2008 | Bhogal et al. |
| 7,730,146 B1 | 6/2010 | Mace et al. |
| 7,730,147 B1 | 6/2010 | Derhak et al. |
| 8,108,464 B1 | 1/2012 | Rochelle et al. |
| 8,108,763 B2 | 1/2012 | Gao et al. |
| 8,122,364 B2 | 2/2012 | Yozell-Epstein et al. |
| 8,185,591 B1 | 5/2012 | Lewis |
| 8,214,395 B2 | 7/2012 | Stevens et al. |
| 8,352,554 B2 | 1/2013 | Estrada et al. |
| 8,386,573 B2 | 2/2013 | O'Sullivan et al. |
| 8,527,549 B2 | 9/2013 | Cidon |
| 8,965,983 B2 | 2/2015 | Costenaro et al. |
| 9,384,470 B2 | 7/2016 | Lemay et al. |
| 9,660,831 B2 | 5/2017 | Chen et al. |
| 9,703,596 B2 | 7/2017 | Lyndersay et al. |
| 9,703,791 B2 | 7/2017 | Blom et al. |
| 9,756,002 B2 | 9/2017 | Massand |
| 2003/0154207 A1 | 8/2003 | Naito |
| 2004/0034688 A1 | 2/2004 | Dunn |
| 2004/0172450 A1 | 9/2004 | Edelstein et al. |
| 2004/0267871 A1 | 12/2004 | Pratley et al. |
| 2006/0069990 A1* | 3/2006 | Yozell-Epstein .... G06Q 10/107 715/273 |
| 2006/0075004 A1 | 4/2006 | Stakutis et al. |
| 2006/0075046 A1 | 4/2006 | Yozell-Epstein et al. |
| 2006/0075049 A1 | 4/2006 | Matsubara |
| 2006/0085508 A1 | 4/2006 | Uchida et al. |
| 2007/0266093 A1 | 11/2007 | Forstall et al. |
| 2008/0028017 A1 | 1/2008 | Garbow et al. |
| 2008/0046518 A1* | 2/2008 | Tonnison ............. G06Q 10/107 709/206 |
| 2009/0177754 A1 | 7/2009 | Brezina et al. |
| 2009/0228716 A1 | 9/2009 | Poston et al. |
| 2009/0319618 A1 | 12/2009 | Affronti et al. |
| 2010/0077050 A1 | 3/2010 | Macbeth et al. |
| 2010/0159889 A1* | 6/2010 | Sigmund ................. H04M 3/02 455/413 |
| 2010/0198927 A1 | 8/2010 | Tonnison et al. |
| 2010/0257457 A1 | 10/2010 | De Goes |
| 2011/0276897 A1* | 11/2011 | Crevier ............... H04L 61/1564 715/752 |
| 2012/0124143 A1 | 5/2012 | Chung et al. |
| 2012/0173612 A1 | 7/2012 | Vegesna-Venkata et al. |
| 2012/0179696 A1* | 7/2012 | Charlot ............... G06F 16/2365 707/750 |
| 2012/0254321 A1 | 10/2012 | Lindsay et al. |
| 2012/0265817 A1 | 10/2012 | Vidalenc et al. |
| 2012/0278281 A1 | 11/2012 | Meisels et al. |
| 2012/0278401 A1 | 11/2012 | Meisels et al. |
| 2012/0278404 A1 | 11/2012 | Meisels et al. |
| 2012/0278405 A1 | 11/2012 | Costenaro et al. |
| 2012/0284344 A1 | 11/2012 | Costenaro et al. |
| 2012/0284345 A1 | 11/2012 | Costenaro et al. |
| 2012/0284639 A1* | 11/2012 | Yuniardi ................. G06Q 10/00 715/752 |
| 2013/0080545 A1 | 3/2013 | Datta |
| 2013/0080785 A1 | 3/2013 | Ruhlen et al. |
| 2013/0117376 A1 | 5/2013 | Filman et al. |
| 2013/0179515 A1 | 7/2013 | Chi et al. |
| 2013/0212112 A1 | 8/2013 | Blom et al. |
| 2013/0262420 A1 | 10/2013 | Edelstein et al. |
| 2013/0332850 A1 | 12/2013 | Bovet et al. |
| 2014/0006516 A1 | 1/2014 | Nivala et al. |
| 2014/0195928 A1 | 7/2014 | Carlen |
| 2014/0317210 A1 | 10/2014 | Song et al. |
| 2015/0277724 A1 | 10/2015 | Masterson et al. |
| 2015/0277725 A1 | 10/2015 | Masterson et al. |
| 2015/0281149 A1 | 10/2015 | Masterson et al. |
| 2017/0230318 A1 | 8/2017 | Carlen |
| 2019/0372922 A1 | 12/2019 | Masterson et al. |

FOREIGN PATENT DOCUMENTS

| | | |
|---|---|---|
| CN | 1755680 A | 4/2006 |
| CN | 101315621 A | 12/2008 |
| CN | 102812477 A | 12/2012 |
| CN | 102859513 A | 1/2013 |
| EP | 1182600 A2 | 2/2002 |
| KR | 20050002576 A | 1/2005 |
| KR | 20090029858 A | 3/2009 |
| KR | 20100123562 A | 11/2010 |

OTHER PUBLICATIONS

Thurroti, Paul., "Windows 8.1 Tip: Master Auto-Snap", Published on: Sep. 22, 2013 Available at: http://winsupersite.com/windows-8/windows-81-tip-master-auto-snap.

"OSX : Force mail.app to show attachments as iconsDate", Published on: Feb. 12, 2014 Available at http://endlessgeek.com/2014/02/osx-force-mai 1-app-show-attachments-icons/.

"Zoho Docs—New Features and Enhancements", Published on: Jan. 11, 2012, Available at https://www.zoho.com/docs/whatsnew.html.

"Share and Collaborate in Drive on your iPhone and iPad", Retrieved on: Mar. 24, 2014, Available at: https://support.google.com/drive/answer/2498081 ?hl=en.

"Biogs, Twitter, wikis and other web-based tools", Published on: Jun. 16, 2011, Available at http://research20atimperial.wordpress.com/optional-content/online-collaborative-tools/.

"Acrobat.com Help I Collaborate in real time", Published on: Mar. 29, 2013, Available at: http://helpx.adobe.com/acrobat-com/help/collaborate-real-time.html.

Thurroti, Paul, "Microsoft Previews Real-Time Co-authoring in Office Web Apps" Published on: Jun. 20, 2013, Available at: http://winsupersite.com/office-365/microsoft-previews-real-time-co-authoring-office-web-apps.

"Zoho API Guide", Published on: Sep. 27, 2011, Available at: https://apihelp.wiki.zoho.com/Doc-Collaboration.html.

"International Search Report and Written Opinion Issued in PCT Application No. PCT/US2015/022612", dated Jun. 29, 2015, 11 Pages.

PCT International Preliminary Report on Patentability Issued in PCT Application No. PCT/US2015/022612, dated Apr. 7, 2016, 15 Pages.

Hodges, Matt., "Mission Control: Advanced Attachment Management in Confluence with Arsenale Lockpoint", Published on: Jan. 9, 2012 Available at: https://blogs.atlassian.com/2012/01/extend-confluence-wiki-document-management-capabilities/.

Wolber, Andy., "View and edit Microsoft Office file attachments received in Gmail", Published on: Jan. 28, 2014 Available at: http://www.techrepublic.com/blog/google-in-the-enterprise/view-and-edit-microsoft-office-file-attachments-received-in-gmail/#.

Bradley, Helen., "Share & Collaborate with SkyDrive & Microsoft Office", Published on: Feb. 15, 2013 Available at: http://www.smallbusinesscomputing.com/News/Software/share-collaborate-with-skydrive-microsoft-office.html.

"Final Office Action Issued in U.S. Appl. No. 14/497,263", dated May 17, 2017, 36 Pages.

"Final Office Action Issued in U.S. Appl. No. 14/497,263", dated May 29, 2018, 59 Pages.

(56) References Cited

OTHER PUBLICATIONS

"Non Final Office Action Issued in U.S. Appl. No. 14/497,263", dated Sep. 26, 2016, 40 Pages.
"International Search Report and Written Opinion Issued in PCT Application No. PCT/US2015/022611", dated Jun. 29, 2015, 11 Pages.
"International Preliminary Report on Patentability Issued in PCT Application No. PCT/US2015/022611", dated Apr. 7, 2016, 8 Pages.
"Final Office Action Issued in U.S. Appl. No. 14/497,270", dated Apr. 2, 2018, 58 Pages.
"Non Final Office Action Issued in U.S. Appl. No. 14/497,270", dated Oct. 5, 2017, 54 Pages.
"Final Office Action Issued in U.S. Appl. No. 14/497,273", dated Feb. 23, 2017, 35 Pages.
"Final Office Action Issued in U.S. Appl. No. 14/497,273", dated May 11, 2018, 49 Pages.
"Non Final Office Action Issued in U.S. Appl. No. 14/497,273", dated Jun. 28, 2017, 53 Pages.
"Non-Final Office Action Issued in U.S. Appl. No. 14/497,273", dated Sep. 16, 2016, 33 Pages.
"International Preliminary Report on Patentability Issued in PCT Application No. PCT/US2015/022610", dated Apr. 7, 2016, 8 Pages.
"Non Final Office Action Issued in U.S. Appl. No. 14/497,270", dated Sep. 21, 2016, 35 Pages.
"Final Office Action Issued in U.S. Appl. No. 14/497,270", dated Apr. 14, 2017, 42 Pages.
"International Preliminary Report on Patentability Issued in PCT Application No. PCT/US2015/022608", dated Jun. 16, 2016, 10 Pages.
"International Search Report and Written Opinion Issued in PCT Application No. PCT/US2015/022608", dated Jun. 15, 2015, 12 Pages.
"Non Final Office Action Issued in U.S. Appl. No. 14/497,273", dated Nov. 16, 2018, 47 Pages.
"Office Action Issued in Chinese Patent Application No. 201580018360 7", dated Oct. 22, 2018, 12 Pages.
"Non Final Office Action Issued in U.S. Appl. No. 14/497,263", dated Dec. 19, 2017, 50 Pages.
"Office Action Issued in European Patent Application No. 15717322.0", dated Jun. 15, 2018, 5 Pages.
European Office Action in Application 15717322.0, dated Nov. 8, 2016, 2 pages.
PCT International Search Report & Written Opinion Received for PCT Patent Application No. PCT/US2015/022610, dated Jun. 29, 2015, 12 Pages.
PCT Second Written Opinion Issued in Application No. PCT/US2015/022610, dated Dec. 4, 2015, 7 Pages.
PCT Second Written Opinion Issued in PCT Application No. PCT/US2015/022608, dated Feb. 5, 2016, 6 Pages.
U.S. Appl. No. 14/497,263, Office Action dated Nov. 1, 2018, 66 pages.
European Office Action in Application 15715090.5, dated Oct. 29, 2018, 8 pages.
"Office Action Issued in European Patent Application No. 15716277.7", dated Jan. 9, 2019, 7 Pages.
"Office Action Issued in Chinese Patent Application No. 201580018310.9", dated Mar. 5, 2019, 17 Pages.
"Office Action Issued in Chinese Patent Application No. 201580018358.X", dated Mar. 5, 2019, 10 Pages.
"Office Action Issued in Chinese Patent Application No. 201580018367.9", dated Mar. 6, 2019, 10 Pages.
"Second Office Action Issued in Chinese Patent Application No. 201580018367.9" dated Aug. 9, 2019, 6 Pages.
"Second Office Action Issued in Chinese Patent Application No. 201580018358.X", dated Aug. 22, 2019, 5 Pages.
"Second Office Action Issued in Chinese Patent Application No. 201580018360.7", dated Apr. 19, 2019, 9 Pages.
"Office Action Issued in Indian Patent Application No. 201647031704", dated Feb. 21, 2020, 8 Pages.
"Summons to Attend Oral Proceedings Issued in European Patent Application No. 15715090.5", dated May 4, 2020, 9 Pages.
"Non Final Office Action Issued in U.S. Appl. No. 16/540,348", dated Apr. 29, 2020, 16 Pages.
"Summons to Attend Oral Proceedings Issued in European Patent Application No. 15716277.7", dated May 15, 2020, 9 Pages.
"Office Action Issued in Indian Patent Application No. 201647031705", dated Nov. 30, 2020, 7 Pages.
Office Action Issued in Korean Patent Application No. 10-2016-7027103, dated Mar. 2, 2021, 5 Pages.
"Office Action Issued in Indian Patent Application No. 201647031706", dated Mar. 12, 2021, 8 Pages.
"Final Office Action Issued in Chinese Patent Application No. 201580018367.9", dated Dec. 4, 2019, 7 Pages.
"Office Action Issued in Korean Patent Application No. 10-2016-7027163", dated Jul. 13, 2021, 14 Pages.
"Office Action Issued in Korean Patent Application No. 10-2016-7027272", dated Jul. 12, 2021, 7 Pages.
"Office Action Issued in Korean Patent Application No. 10-2016-7027272", dated Jan. 18, 2022, 7 Pages.
"Office Action Issued in Korean Patent Application No. 10-2016-7027272", dated Mar. 16, 2022, 14 Pages.

* cited by examiner

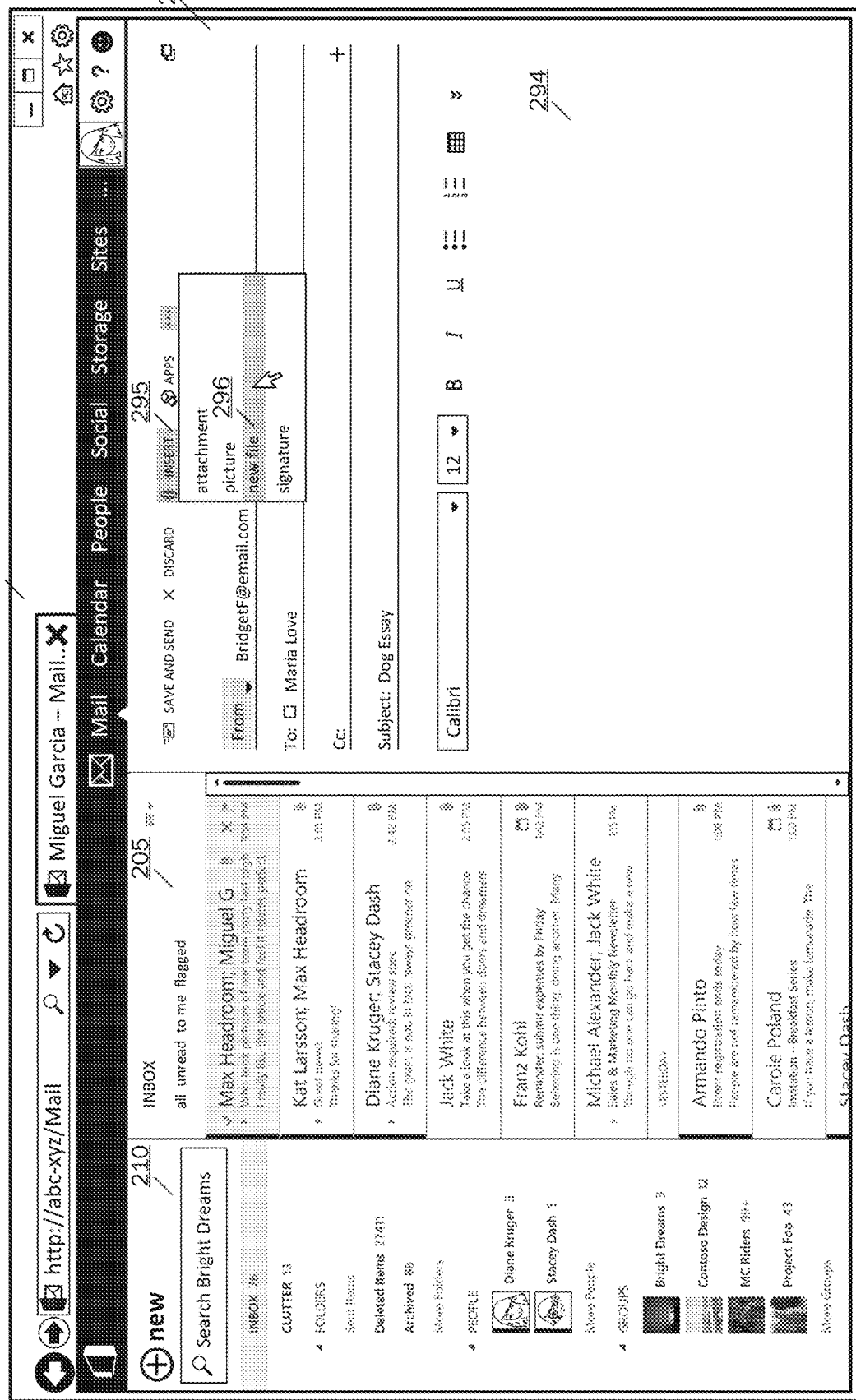

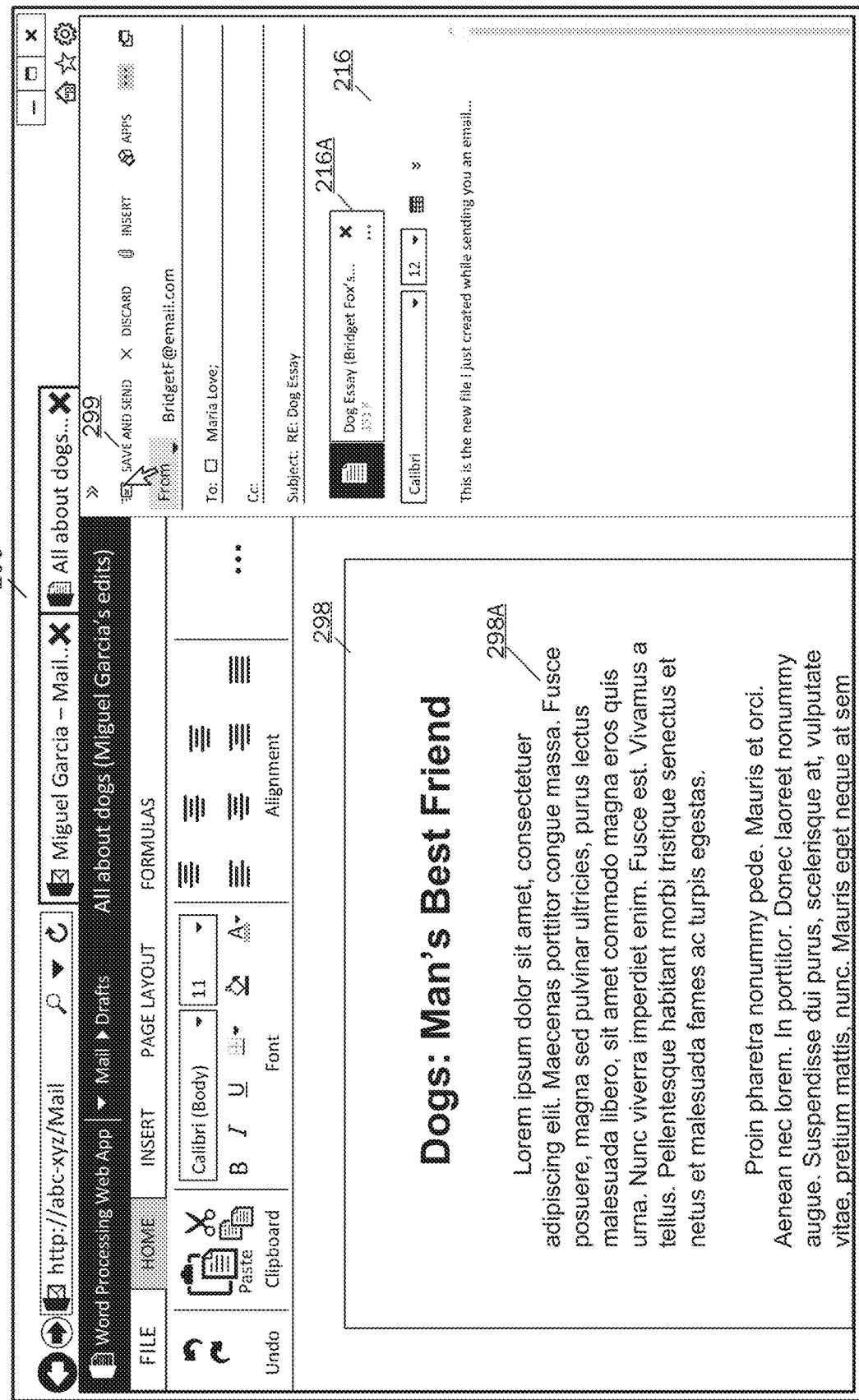

GENERATING CONTENT ITEMS OUT OF AN ELECTRONIC COMMUNICATION WORKFLOW

CROSS-REFERENCE TO RELATED APPLICATIONS

This application claims the benefit of U.S. Provisional Patent Application No. 61/973,139, filed Mar. 31, 2014.

BACKGROUND OF THE INVENTION

Computer and computer software users have become accustomed to generating, editing, receiving and sending many types of content items, for example, documents of different types, photographs, images, electronic mail items, calendaring items, notes items, and the like. In a typical electronic mail setting, a user often attaches a document or other content item (hereafter referred to as "attachment" or "content item") to an electronic mail item he/she then sends to a receiving user for review or editing. The receiving user then typically downloads the received attachment to her local computing device or to an enterprise (local or remote) storage depository, for example, a company or school file server or a remote server at which the receiving user has a storage location or at a collaborative file storage location at which the sending user and the receiving user store content items for receiving and editing as part of a collaborative work group of any of a number of types.

That is, many user tasks involve using both content items of various types and electronic communications (e.g., electronic mail) together in a general workflow that involves sending and receiving electronic communications and reviewing various content items. Current software solutions treat electronic communications and content items as two separate entities. Users must do a lot of manual work such as opening received attached content items, editing and saving attached content items, re-attaching edited content items to a subsequent electronic communication, and then sending the communication along with the edited and attached content item to a desired one or more recipients. There is a need for methods and systems for allowing relevant content items to be paired with relevant communications (electronic mail or other types of communications) so that a user may reduce the time-consuming and inefficient process of receiving, storing, editing, storing, retrieving, attaching, and disposing of content items in association with an electronic communications system. It is with respect to these and other considerations that the present invention has been made.

SUMMARY OF THE INVENTION

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing inline document collaboration workflows. According to embodiments, when a user receives an electronic communication that includes an attached content item, the receiving user may select the attached content item and cause the attached content item to be displayed in an immersive view in proximity to an electronic communication pane in which an electronic communication may be conducted about any topic including the content item that is displayed in proximity to the electronic communication pane. Electronic communications may be conducted without edits to the selected and displayed content item. Alternatively, if the user desires to edit the selected and displayed content item, the user may enter an editing mode wherein functionality associated with a document type of the selected and displayed document may be displayed in the immersive view pane where the selected and displayed document is displayed. Using the provided functionality, the user may edit the displayed document, and according to one embodiment, upon editing the desired document, an instance of the edited document may be automatically saved for subsequent communication. According to one embodiment, upon initiating an editing function with respect to a selected and displayed content item, an electronic communication may be automatically generated in the electronic communication pane for attaching a copy of or pointer to the edited content item and for providing a communication to one or more recipients.

According to one embodiment, a "hide" function may be enabled for hiding temporarily or until subsequently "unhidden" the electronic communication thread to allow a greater display surface space for the selected and viewed or edited content item. In addition, a user may initiate and conduct an electronic communication about a content item by initiating the electronic communication from a client application associated with the content item.

According to another embodiment, a new content item may be generated out of an electronic communications user interface. For example, if a user is utilizing an electronic mail client application and an associated user interface, an insert function may be provided for allowing the user to insert a new content item of various types into the electronic communications user interface. If the user selects to enter a file of a given file type, an instance of a user interface for the selected document type that includes functionality of the associated application, for example, word processing functionality, may be displayed in the immersive view pane of the electronic communication user interface for allowing the user to create a content item of the desired document type.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DESCRIPTION OF THE DRAWINGS

FIG. 2A illustrates a computer-generated user interface of an electronic mail application with which embodiments the present invention practiced.

FIG. 2C illustrates a computer-generated user interface of an electronic mail application with an immersive view pane in which a received content item may be displayed for viewing.

FIG. 2D illustrates a computer-generated user interface of an electronic mail application with an immersive view pane in which a received content item may be displayed for viewing.

FIG. 2G illustrates a computer-generated user interface of an electronic mail application and showing attachment of an edited content item for disposition according to embodiments of the present invention.

FIG. 2K illustrates a computer-generated electronic communication user interface in which a content item may be created.

FIG. 2M illustrates a computer-generated electronic communication user interface in which a content item may be created.

DETAILED DESCRIPTION

Figure 1:
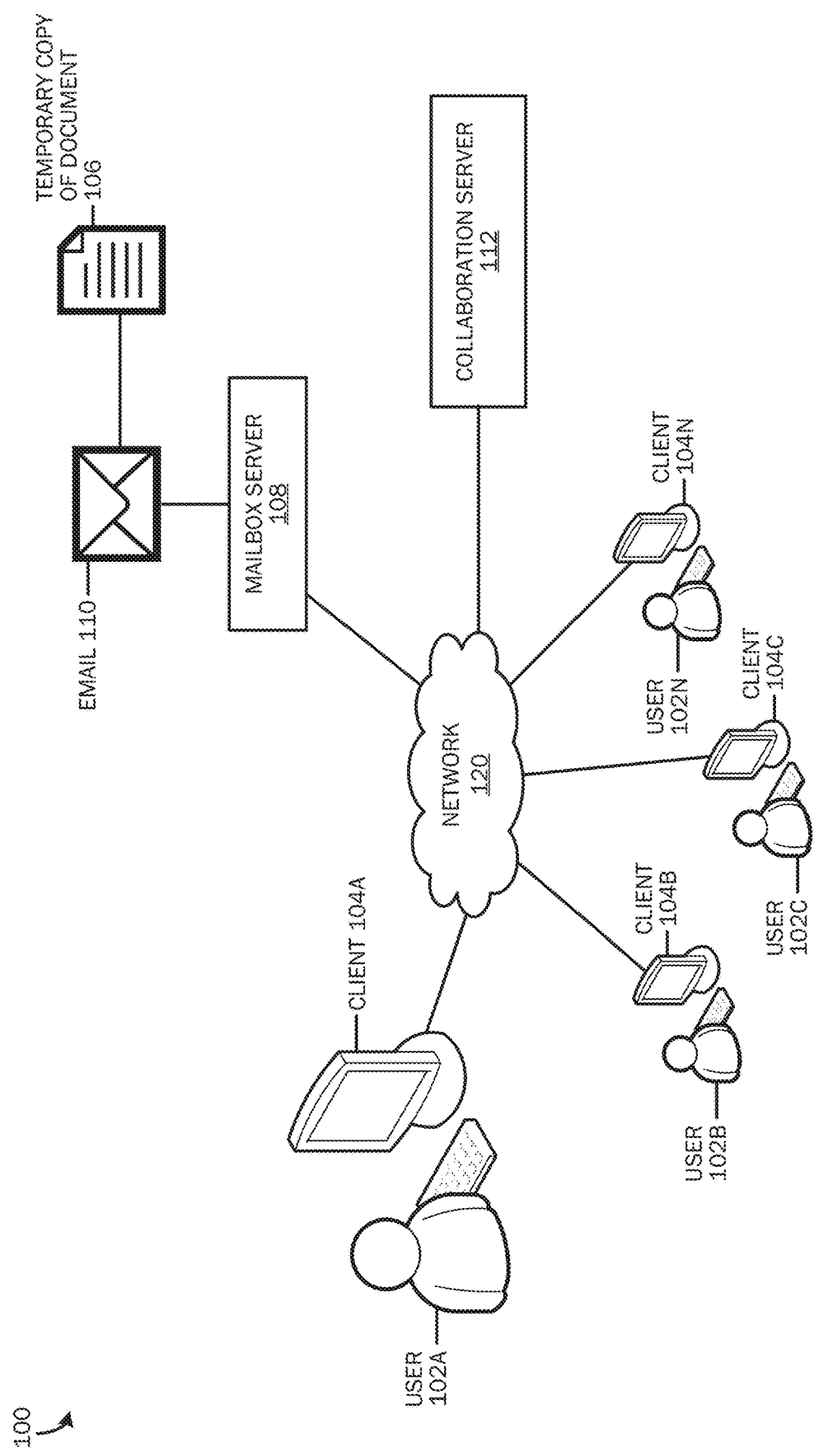
FIG. 1 is simplified block diagram illustrating a system for electronic communication-based storage and use of documents and other content items to support multiple workflows.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to providing inline document collaboration workflows. According to embodiments, when a user receives an electronic communication such as electronic mail, text message, instant message, chat message, or the like, where the electronic communication includes an attached content item, for example, a document, dataset, image, and the like, the receiving user may select the attached content item and cause the attached content item to be displayed in an immersive view in a user interface in a side-by-side or top/bottom orientation relative to an electronic communication pane in which an electronic communication may be conducted about any topic including the content item that is displayed in proximity to the electronic communication pane.

Electronic communications may be conducted without edits to the selected and displayed content item. Alternatively, if the user desires to edit the selected and displayed content item, the user may enter an editing mode wherein functionality associated with a document type of the selected and displayed document (for example, a word processing functionality, a spreadsheet functionality, slide presentation functionality, notes taking functionality, and the like) may be displayed in the immersive view pane where the selected and displayed document is displayed. Using the provided functionality, the user may edit the displayed document, and according to one embodiment, upon editing the desired document, an instance of the edited document may be automatically saved with the electronic communication message at an electronic communication server, or alternatively, the changes made to the edited document may be pushed to a corresponding instance of the document stored at another storage location.

Upon initiating an editing function with respect to a selected and displayed content item, an electronic communication may be automatically generated in the electronic communication pane for attaching a copy of or pointer to the edited content item and for providing a communication to one or more recipients to which the edited content item will be sent. Upon sending the automatically-generated communication and the attached edited content item, an electronic communication conversation may be displayed in the electronic communication pane showing a conversation thread associated with the edited content item.

According to one embodiment, a "hide" function may be enabled for hiding temporarily or until subsequently "unhidden" the electronic communication thread to allow a greater display surface space for the selected and viewed or edited content item.

A user may initiate and conduct an electronic communication about a content item by initiating the electronic communication from a client application associated with the content item. For example, if a user is currently editing a spreadsheet document in a user interface provided by a spreadsheet application, electronic communication functionality may be provided in the client application user interface, for example, "reply with changes" or "send document to recipients", or the like may be provided in the user interface of the client application. Thus, for example, if a user is editing an example spreadsheet document, the user may select a communications functionality, for example, "reply with changes" functionality, and an instance of electronic communications user interface, for example, an electronic mail user interface, may be provided in proximity to the being-edited document or overlaying the being-edited document, and an electronic communication may be automatically generated in the electronic communication user interface for sending the being-edited document to a desired recipient. According to this embodiment, an attachment of the being-edited document may be automatically placed into the automatically-generated electronic communication, so that a recipient of the communication may select the attachment for view and/or editing the being-edited document.

A new content item may be generated out of an electronic communications user interface. For example, if a user is utilizing an electronic mail client application and an associated user interface, an insert function may be provided for allowing the user to insert a new content item of various types into the electronic communications user interface. If the user selects to enter a file of a given file type, for example, a word processing document, a spreadsheet document, a slide presentation document, a notes taking application document, or the like, an instance of a user interface for the selected document type that includes functionality of the associated application, for example, word processing functionality, may be displayed in the immersive view pane of the electronic communication user interface for allowing the user to create a content item of the desired document type. When the user completes creation of the content item of the desired document type, the newly created document may be stored with an electronic communication at a corresponding electronic communication server, or the document may be saved to a different storage location, as desired.

Upon entering edit mode for the document being created, an electronic communication, for example, an electronic mail, may be automatically generated in a corresponding electronic communication pane, and an attachment may be placed in the automatically-generated electronic communication for sending the being-created content item to a desired recipient. According to this embodiment, upon selection of a save and send function, the newly created document may be both saved to a desired location, and the electronic communication may be sent to a desired recipient along with an attachment of the newly created content item or along with a pointer to a storage location of the newly created content item to allow a recipient of the electronic communication to access the newly created content item.

FIG. 1 is simplified block diagram illustrating a system 100 for electronic communication-based storage and use of documents and other content items to support multiple workflows. As Illustrated in FIG. 1, a variety of users 102a, 102b, 102c, 102n are illustrated in association with respective client devices 104a, 104b, 104c, 104n. The users and the associated client devices are illustrative of one or more users who may generate, edit, receive, send, or otherwise interact with content items of various types as described herein. The client devices 104a-104n are illustrative of a variety of computing devices, for example, desktop computing devises, laptop computing devices, tablet computing devices, handheld computing devices (mobile phones), and the like. Each of the example computing devices may be interacted with according to a variety of input means, for example, keyboard input, mouse input, electronic pen and ink input, touch input, gesture input, voice input, eye tracking input, and the like. At each of the client devices 104a-104n, a variety of software applications may be provided for allowing the one or more users to interact with a variety of content items. For example, software applications such as electronic mail applications, word processing applications, slide presentation applications, spreadsheet applications, notes taking applications, desktop publishing applications, calendaring applications, image processing and editing applications, and the like may be operated at the client devices by the one or more users 102a-102n. The network 120 is illustrative of an enterprise-based network, for example, an intranet, or a distributed computing network, for example, the Intranet, over which the various users may communicate with each other and with other computing systems, as described herein.

The mailbox server 108 is illustrative of an electronic communication system that may be located local to one of the various users, or that may be located remotely from the various users for allowing electronic mail and other electronic communications between the various users. An example of a server 108 may be an EXCHANGE server from Microsoft Corporation. The electronic communication item 110 (e.g., email item) is illustrative of an electronic communication that may be communicated between one or more users for passing text-based communications, and a variety of attached files, for example, audio files, text files, image files, data files, and the like. The temporary copy of a document 106 is illustrative of a temporary storage of an edited attached content item that is edited in association with an electronic communication item and that is temporarily stored with an electronic communication at the electronic mail server 108 for disposition according to embodiments of the present invention. The collaboration server 112 is illustrative of a local or remote storage repository at which one or more content items may be stored. For example, the collaboration server 112 may be a shared resources server located at an enterprise accessible by the various users, or may be remotely located from the various users at which the various users may store and collaborate on various documents. An example of such a collaboration server 112 may include a SHAREPOINT server or ONEDRIVE server from Microsoft Corporation.

According to embodiments, when an attached content item is received and edited by a given user, a temporary copy 106 of the edited content item is stored with the received electronic communication item 110 at the electronic communication server 108. The content item is only stored at the collaboration server 112 if a given user desires to store the received content item apart from the electronic communication server 108 as described with respect to embodiments illustrated and described herein.

Figure 2A:
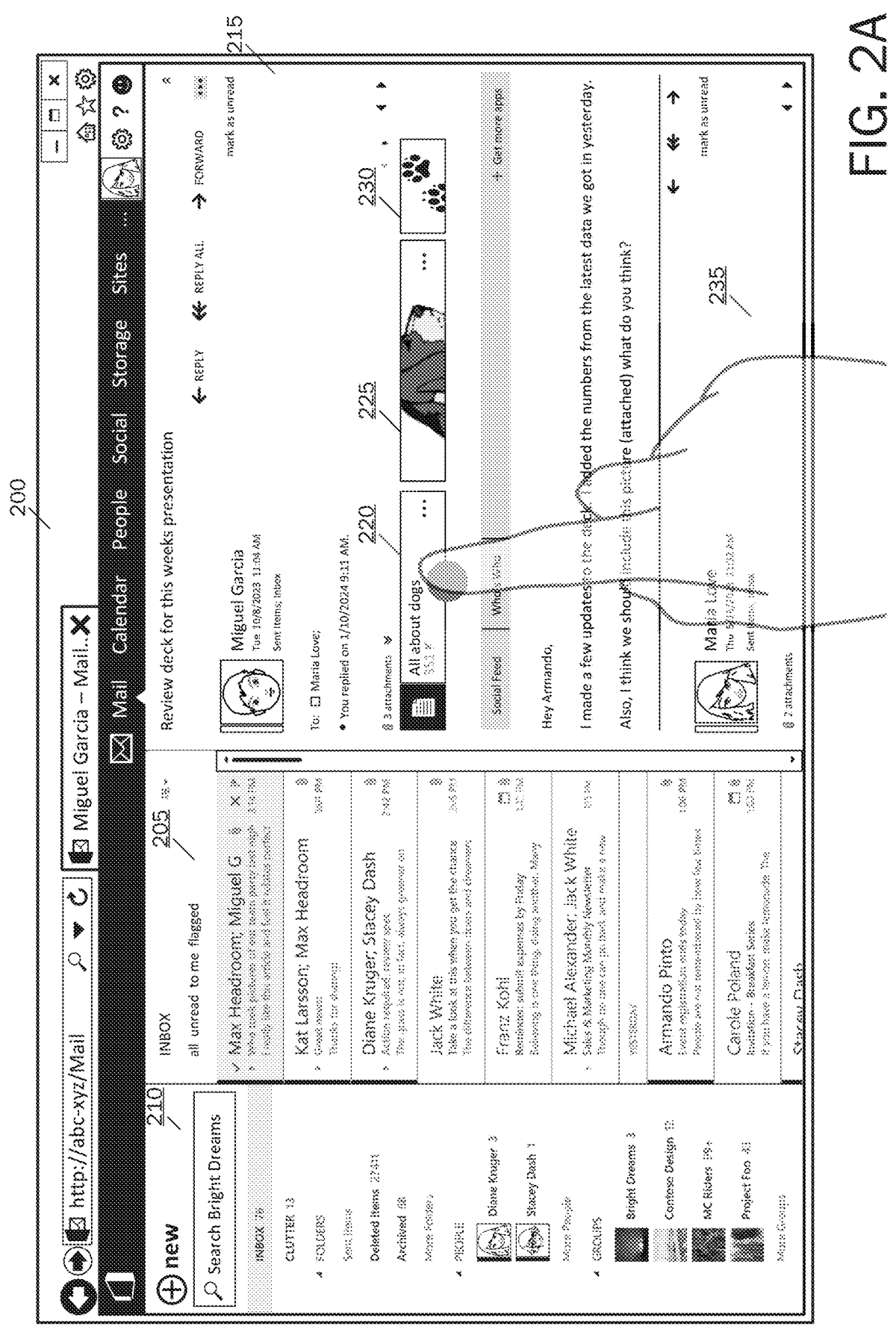

FIG. 2A illustrates a computer-generated user interface of an electronic communication application with which embodiments the present invention practiced. An example electronic communication application suitable for embodiments described herein includes OUTLOOK from Microsoft Corporation. As illustrated in FIG. 2A, a user interface 200 for an example electronic mail application with which a user may send and receive a variety of electronic messages, and with which a user may send and receive content item attachments according to embodiments of the present invention is illustrated. An electronic mail folder pane 210 is illustrated on the left side of the user interface 200 in which a variety of folders, contact items, group items, calendar items, and the like, may be provided to allow a user to select various folders, contacts, or other items associated with her electronic communication application functionality. An electronic communication items folder 205 is illustrated in which a variety of electronic communication items received by the receiving user are displayed that may be selectively reviewed and responded to according to the functionality of the associated electronic communication application. For example, the pane 205 may include an inbox for listing all received electronic mail items, a sent box for listing sent electronic mail items and/or the contents of a given folder of electronic communication items.

On the right side of the example user interface 200 is displayed an electronic communication viewing pane in which a given electronic communication message or electronic communication conversation thread of items may be displayed for allowing a user to read or otherwise interact with a given electronic communication message, for example, replying to the message, forwarding the message, and the like. That is, upon selection of a given communication item (e.g., an electronic mail item) listed in an inbox displayed in the pane 205, the selected item may be opened in the pane 215 to allow the user to read or respond to the communication item. If the selected communication item contains a thread of multiple communication items comprising a communication conversation, then the entire thread of items may be displayed in the pane 215 to allow the user to navigate through the various items in the thread.

As illustrated in FIG. 2A, an example electronic mail message 235 has been received by the receiving user and has been opened in the electronic communications pane or canvas 215. The received electronic mail message includes three example attachments 220, 225, 230. As should be appreciated, the attachments 220, 225, 230 are illustrative of any attached content item, for example, a word processing document, a spreadsheet document, a slide presentation document, a notes document, an image file, a photograph, and the like, that may be received by the receiving user from a sending user.

If a user selects one of the attached content items 220, 225, 230, the selected content item may be displayed in an immersive view pane 237 for allowing a user to view and/or edit the selected content item. As illustrated in FIG. 2A, an example user selects the example word processing document attachment icon 220 for viewing and interacting with the selected document 220, as described herein.

Figure 2B:
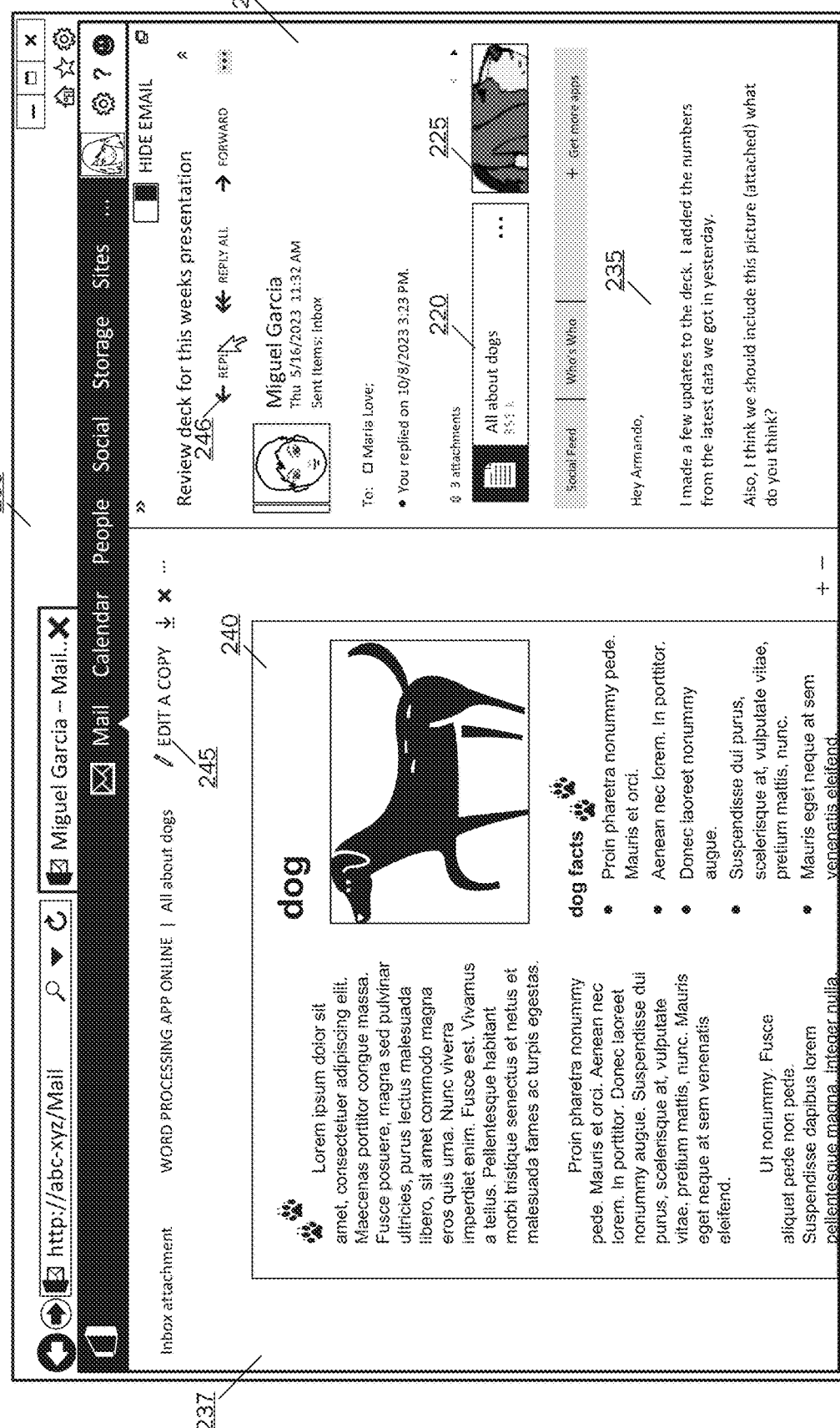
FIG. 2B illustrates a computer-generated user interface of an electronic mail application with an immersive view pane in which a received content item may be displayed for viewing.

Referring now to FIG. 2B, in response to the receiving user's selection of the attachment item 220, as illustrated in FIG. 2A, the associated document 240 is automatically displayed in an immersive view pane 237 for allowing the user to review and interact with the associated document 240. As illustrated in FIG. 2B, the immersive view pane is positioned on the left side of the user interface 200, and the electronic mail view pane 215 remains displayed on the right side of the user interface 200. As should be appreciated, the respective viewing panes may be displayed in other orientations, for example in a right/left orientation where the immersive view pane is displayed on the right side of the user interface and the electronic mail pane is displayed on the left, a top/bottom orientation where the immersive view pane is displayed on the top of the interface 200 and the electronic communication pane is displayed on the bottom of the interface 200, or a bottom/top orientation where the immersive view pane is displayed on the bottom of the interface 200 and the electronic communication view pane is displayed on a top of the interface 200. Alternatively, if the computing device in use by the receiving user is a small form device, such as a tablet computing device or mobile phone, and display space is insufficient for displaying both the immersive view pane and the electronic communication view pane, then the immersive view pane 237 may be displayed over the entire display surface of the computing device, and a functionality button or control may be provided for selectively returning the electronic communication view pane to display, as desired. Alternatively, a truncated display of the electronic communication view pane may be provided and the remaining display space may be used for the immersive view pane.

Referring still to FIG. 2B, according to one embodiment, a user of the electronic communication user interface 200 may begin an electronic communication in the electronic communication pane 215 without editing the content item 240 selected and displayed in the immersive view pane 237. That is, by selecting one or more communication functions, for example, the reply function 246, a reply to all function, a forward function, and the like, the user may conduct an electronic communication with a variety of users inside the electronic communication pane 215 without affecting a display of the content item 240 displayed in the immersive view pane 237.

Figure 2C:
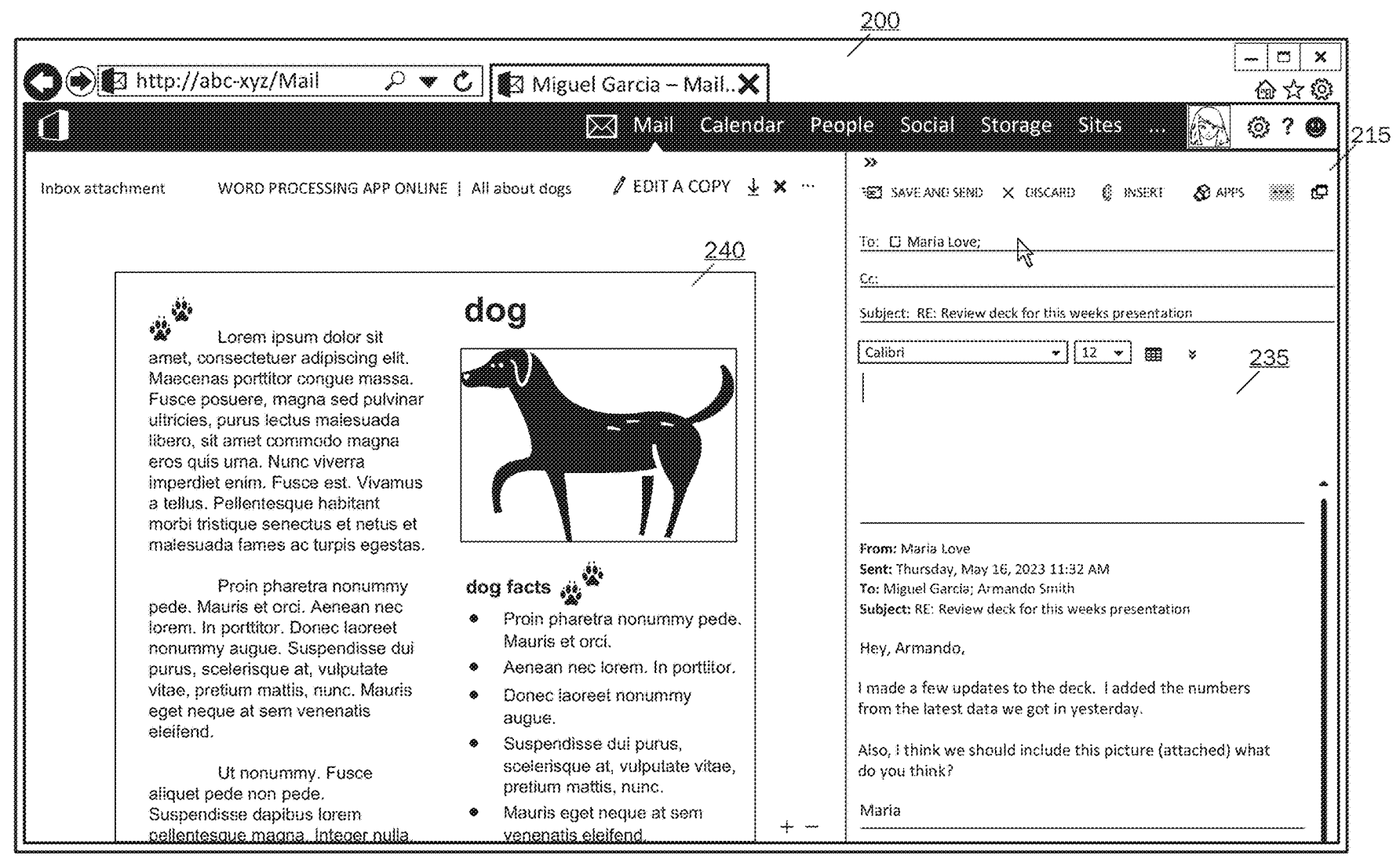

Referring to FIG. 2C, after selection of an electronic mail conversation function, for example, the reply function 246, a new electronic communication is illustrated as being generated in the electronic communication pane 215 for allowing the user to enter an electronic communication. As should be appreciated, if desired, the user generating the electronic communication 235 may attach the content item 240 to the communication 235 for sending the communication and the attached content item to one or more other recipients, or the user may simply wish to reply back to the sending user that originally sent the communication having the attached content item 240. In such a case, each user at two different locations may select and display the attached content item 240 in their respective immersive view panes, while simultaneously conducting an electronic communication in the electronic communication pane 215 about any topic, including the content item 240 that is displayed in the immersive view panes of each of their respective electronic communication user interfaces 200.

Figure 2D:
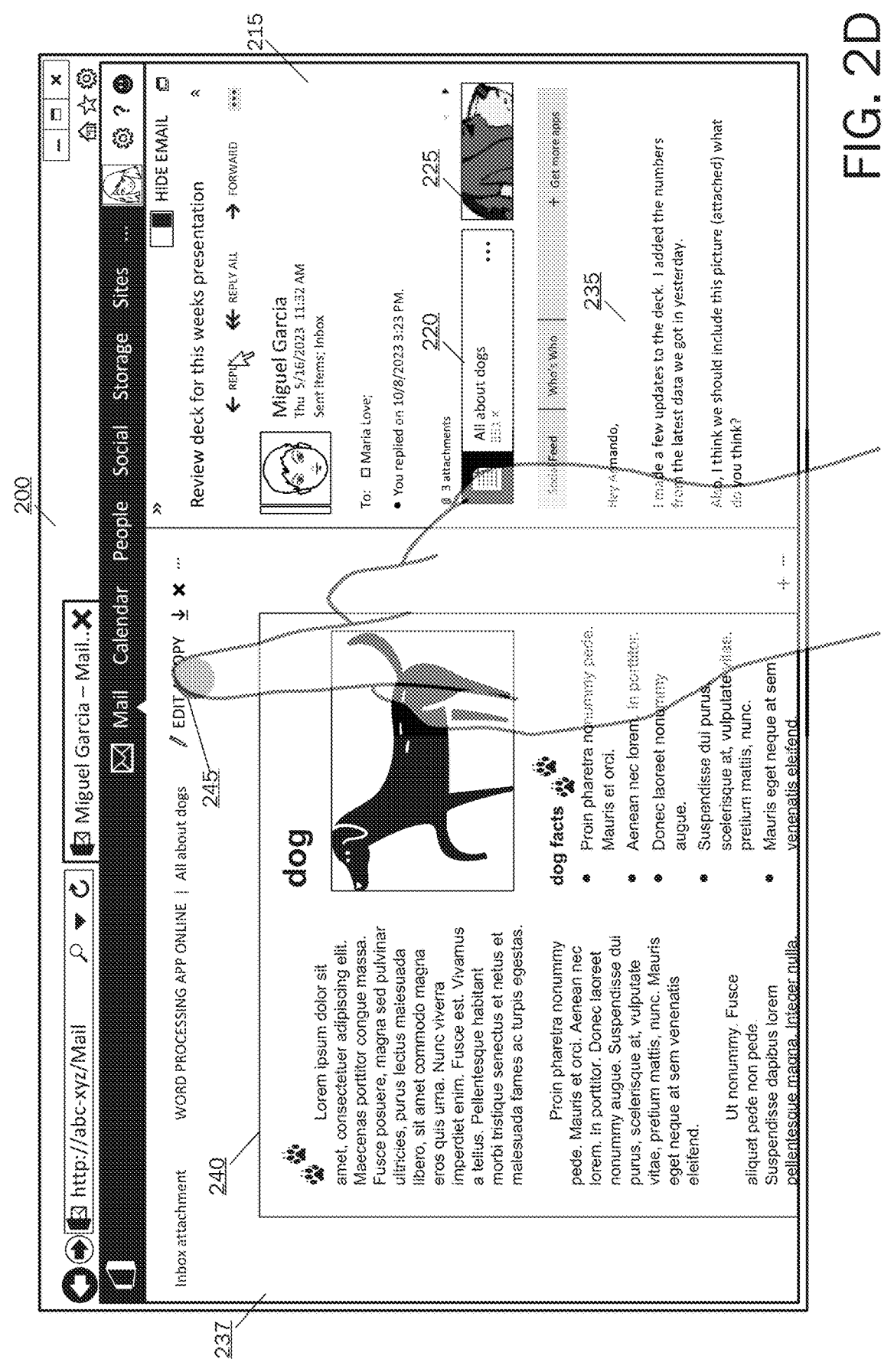

Referring now to FIG. 2D, an edit/copy function 245 is provided for allowing a user to selectively edit the document 240 displayed in the immersive view pane 237. That is, as will be described below, selection of the edit/copy function 245 may cause a provision of functionality associated with the document 240 to allow the user to edit the document 240 in association with the provided functionality. As should be appreciated, the edit/copy function 245 is illustrative of one of a variety of functions that may be provided in the immersive view pane for allowing a user to operate on the document displayed in the immersive view pane. For example, other functions that may be provided may include a send function for allowing the user to send the document 240 to another user, a save function for allowing a user to save the document to a storage location such as the collaboration server 112, described above, and the like.

Figure 2E:
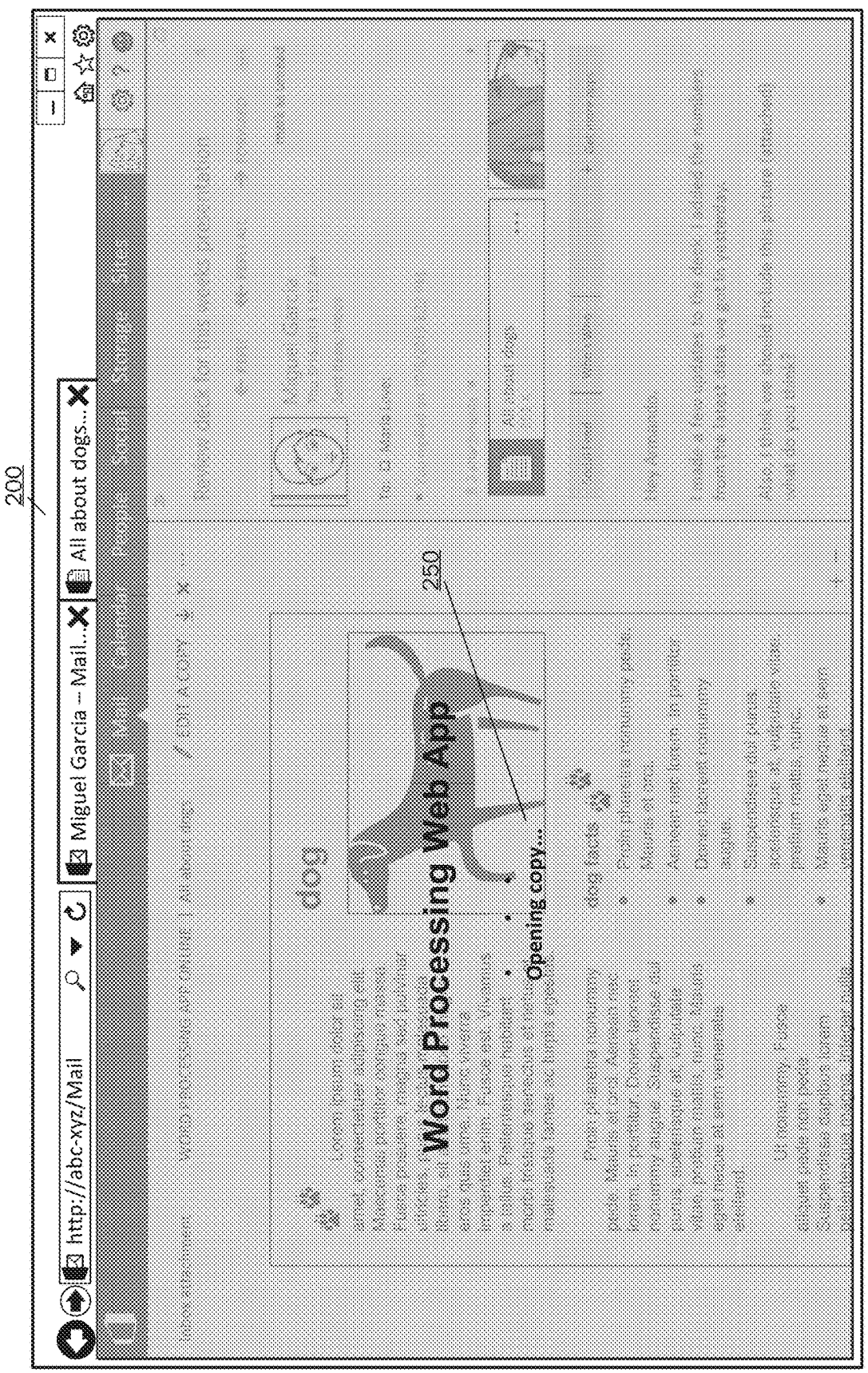
FIG. 2E illustrates a computer-generated user interface of an electronic mail application with an immersive view pane and showing a launching of a software application associated with a received content item.

Referring to FIG. 2E, according to embodiments of the present invention, if a user selects the edit/copy function 245, an application associated with the content item type for the content item displayed in the immersive view pane may be launched in the immersive view pane. In FIG. 2E, a word processing web-based application 250 is launched in response to a selection of an edit/copy function for the document displayed in the immersive view pane, as illustrated in FIG. 2C. That is, if the document 240 is a word processing application, then selection of an edit function associated with the document 240 may cause the launching and retrieval of word processing functionality for allowing a user to edit the document in association with application functionality with which the document was created. For example, if the document 240 is a spreadsheet document, then selection of an edit function 245 may cause the launching of spreadsheet application functionality in the immersive view pane. Likewise, if the document 240 is a slide presentation, then selection of an edit function 245 may cause the launching and provision of slide presentation application functionality in the immersive view pane for use with the document displayed in the immersive view pane. As illustrated in FIG. 2E, a web-based application 250 is launched in response to the selection of an edit/copy function 245, but as appreciated, a local or remote word processing application may similarly be launched for providing functionality in association with the document 245.

Figure 2F:
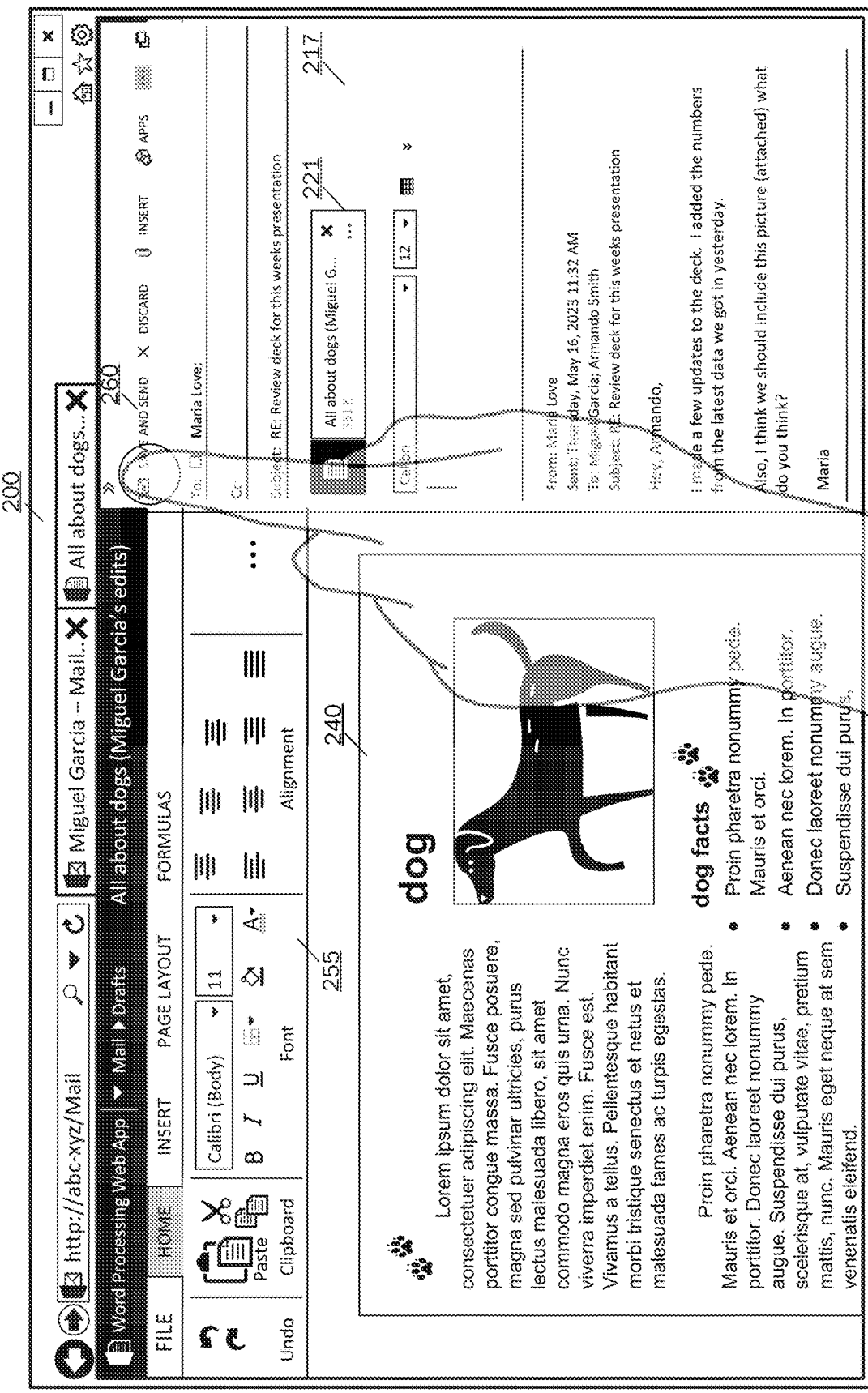
FIG. 2F illustrates a computer-generated user interface of an electronic mail application with an immersive view pane and showing a display of software application functionality for allowing editing of a received content item.

Referring now to FIG. 2F, in response to a selection of an edit/copy function 245, as illustrated in FIG. 2D, and in response to a launching of an associated example word processing application, as illustrated in FIG. 2E, a variety of word processing functionalities 255 may be provided in the immersive view pane for allowing the receiving user to edit the document 240. As should be appreciated, an instance of a word processing application may be launched and displayed in the immersive view pane, or selected functionalities, for example, formatting functionalities may be provided in the immersive view pane for allowing a user to operate certain word processing functions on the document 240. Likewise, if the document 240 is a spreadsheet document, then an instance of a spreadsheet application may be launched in the immersive view pane, or certain functionalities of a spreadsheet application may be provided in the immersive view pane.

Referring still to FIG. 2F, according to one embodiment, when the receiving user selects the document 240 for editing, a draft communication 217, for example, a draft reply electronic mail item may be automatically generated and displayed in the electronic communication view pane to allow the user to communicate the edited document or other content item when the user completes the editing process. Referring to the draft communication 217, according to one embodiment, an automatic reply message to the original sender of the electronic mail message that attached the document 240 that is being edited by the receiving user may be generated so that upon completion of edits to the document 240, the editing user may select a save and send function 260 for automatically attaching the edited version of the document or content item 240 to the draft communication 217 for sending the communication to the original sending user. Thus, a communication from the sending user to the receiving user is enabled where the receiving user opens an attachment 221 received from the sending user, edits the attachment and automatically sends the edited version of the attachment back to the original sending user without the need for saving the attachment to a hard drive or other storage repository at which edits are made and saved followed by a retrieval and re-attachment of the edited content item to a communication for transmitting to the original sending user.

As described above with reference to FIG. 1, when the user begins the editing process for an attached content item, as illustrated in FIG. 2D, a temporary copy of the content item being edited is saved along with the received electronic communication item 110 at the electronic communication server 108. According to one embodiment, the edited attachment is renamed to provide information to an individual recipient of the edited document and to distinguish the edited document from a previous version of the edited document. For example, a document with a file name of "Document A" may be renamed to include a name or other identification for the editing user and a new name of "Document A.editing user" may be applied to the edited version of the attached content item, and the renamed and edited version of the content item may be stored as a temporary copy of the document 106 at the electronic communication server 108, as illustrated in FIG. 1. Thus, the edited version of the content item is not stored at a separate local or remote storage area, such as the collaboration server 112 from which the edited version of the content item must be retrieved for eventual communication to another user.

Referring still to FIGS. 1 through 2F, sending of an edited version of an attached content item back to the original sending user is illustrated and described. According to embodiments, other functionality of the electronic communication application may be utilized for disposing of an edited version of the received attached content item. For example, instead of using a save/send function 260, as illustrated in FIG. 2D, another function such as "send as meeting request" may be provided which, when selected, causes an automatic generation of a meeting request and an automatic attachment of the edited content item to the meeting request. Likewise, another function, such as, "add to notes" may be provided, which when selected, causes an automatic presentation of a notes user interface component in the electronic communication view pane and automatically attaches an edited version of the attached content item to an electronic notes document. Another function, such as, "add to calendar entry" may be provided, which when selected, causes an automatic opening of a calendar function and an automatic attachment of the edited version of the content item to a calendar item in an associated electronic calendaring application. As should be appreciated, any number of functions may be provided similar to the save and send function 260 which when selected may cause the provision of a user interface component in the electronic communication view pane for automatically attaching the edited version of the attached content item to another content item associated with a selected functionality.

Figure 2G:
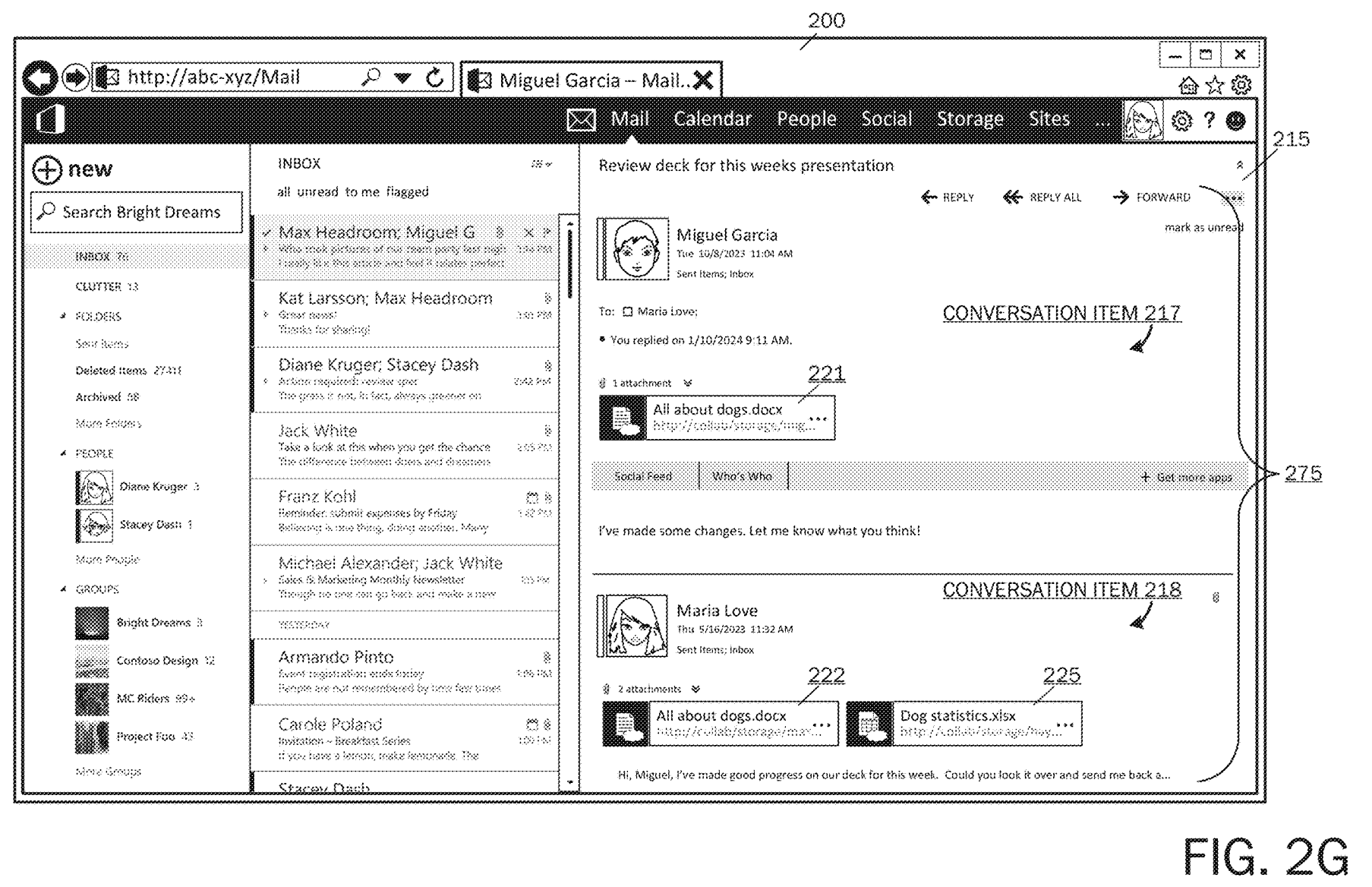

Referring now to FIG. 2G, after the automatically-generated electronic communication is sent to the one or more desired recipients, the sending user may utilize the electronic communication user interface 200 for any electronic communication functionality, for example, electronic mail, text messaging, instant messaging, and the like. According to one embodiment, the sending user may review an electronic communication conversation or thread 275 in the electronic communication pane 215 concerning the recently-sent electronic communication 217 showing the attachment 221 with which the user attached an edited version of the content item 240, and showing a subsequent conversation item 218 received back from the recipient of the user's electronic communication containing yet another version of the content item 240 illustrated as attachment 222, and showing an additional attachment 225 that the sending user wishes to have the recipient review. Thus, an electronic conversation about a given topic including edits to the content item 240 may be conducted between various users.

Figure 2H:
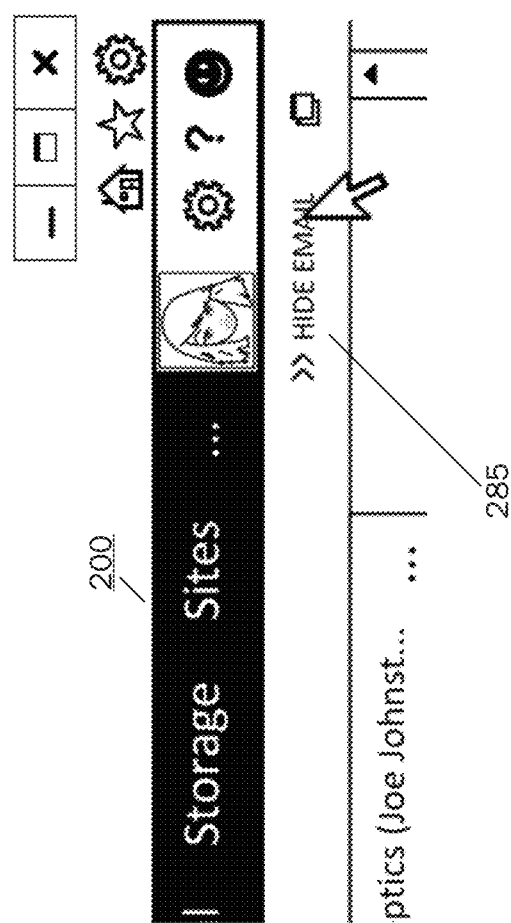
FIG. 2H illustrates a computer-generated user interface showing a "hide email" function.

As illustrated and described above with references to FIGS. 2A through 2G, a content item may be launched from an attachment received in an electronic communication, and launched content item may be displayed in an immersive view pane to allow a user to view the displayed content item and his/her electronic communications simultaneously. Referring now to FIG. 2H, according to an embodiment, a "hide email" function 285 is illustrated which when selected may cause the electronic communications pane 215 to be temporarily hidden from view so that the immersive view pane 237 may be expanded to consume all available display space to allow the user a larger view of the selected content item 240. As should be appreciated, a similar function, for example, a "unhide email" function may be provided after hiding the electronic communications pane for allowing a user to selectively return the electronic communications pane back into view. Similarly, a function may be provided for allowing the user to selectively hide the immersive view pane for allowing a display of other electronic communications panes 210 and 205, as illustrated with reference to FIG. 2A. Similarly, a "unhide" function may be provided for un-hiding the immersive view pane and for bringing the immersive view pane back into display along side the electronic communications pane, as illustrated and described herein.

Figure 2I:
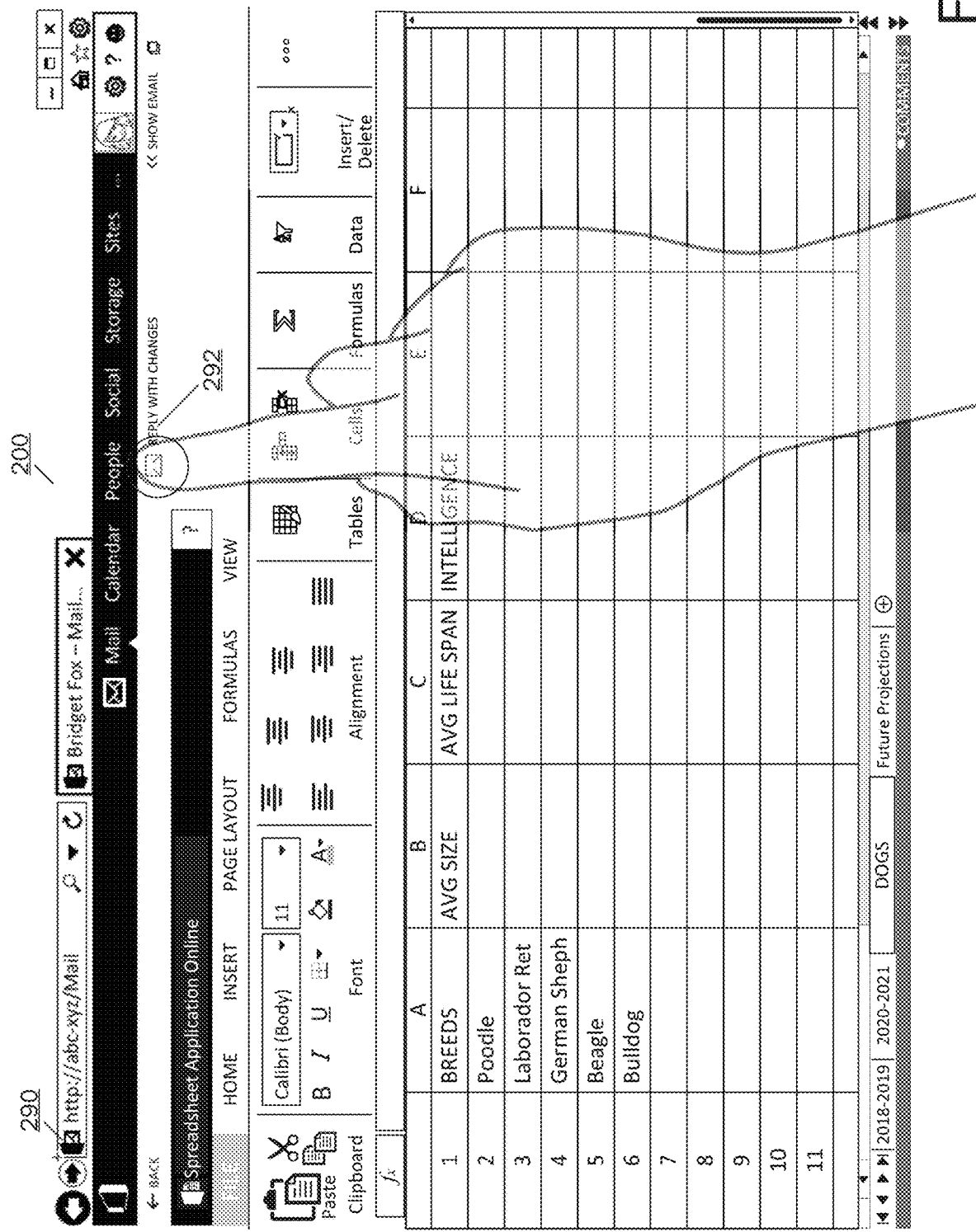
FIG. 2I illustrates a computer-generated software application user interface from which an electronic communication may be launched in association with a content item.

FIG. 2I illustrates a computer-generated software application user interface 200 from which an electronic communication may be launched in association with a content item. As illustrated and described above, a content item, for example, a document, may be launched by selecting an attachment associated with the content item from an electronic communication item which causes a display of the selected item in an immersive view pane. According to another embodiment, an electronic communication functionality and interface may be launched from a content item that is being provided by associated software application functionality. As illustrated in FIG. 2I, a user interface 290 is illustrated as a spreadsheet functionality user interface that may be provided by a spreadsheet application for allowing a user to enter and manipulate various data items. According to this embodiment, one or more electronic communications functionalities 292 may be provided in the user interface of a given software application for initiating an electronic communication out of the user interface in association with a document or other content item being generated via the associated user interface. For example, as illustrated in FIG. 2I, a "reply with changes" functionality 292 is provided in the example spreadsheet application user interface 290 for automatically initiating an electronic communication for communicating with one or more users about any topic, but likely for communicating with other users about the document contained in the user interface from which the communication is initiated.

As should be appreciated, the illustration of the spreadsheet application user interface and associated data is for purposes of example only. That is, electronic communication functionality may be enabled in accordance with the functionality of any software application, for example, a word processing application, a slide presentation application, a notes taking application, a database application, and the like. In addition, the "reply with changes" function 292 is for purposes of example, and is not limiting of other electronic communications functionalities, for example, "forwarding", "sending", "send as an attachment", "forward as an attachment", and the like. That is, any electronic communication functionality available to an associated electronic communications application, for example, an electronic mail application, may be provided as a selectable functionality in a given software application user interface.

Figure 2J:
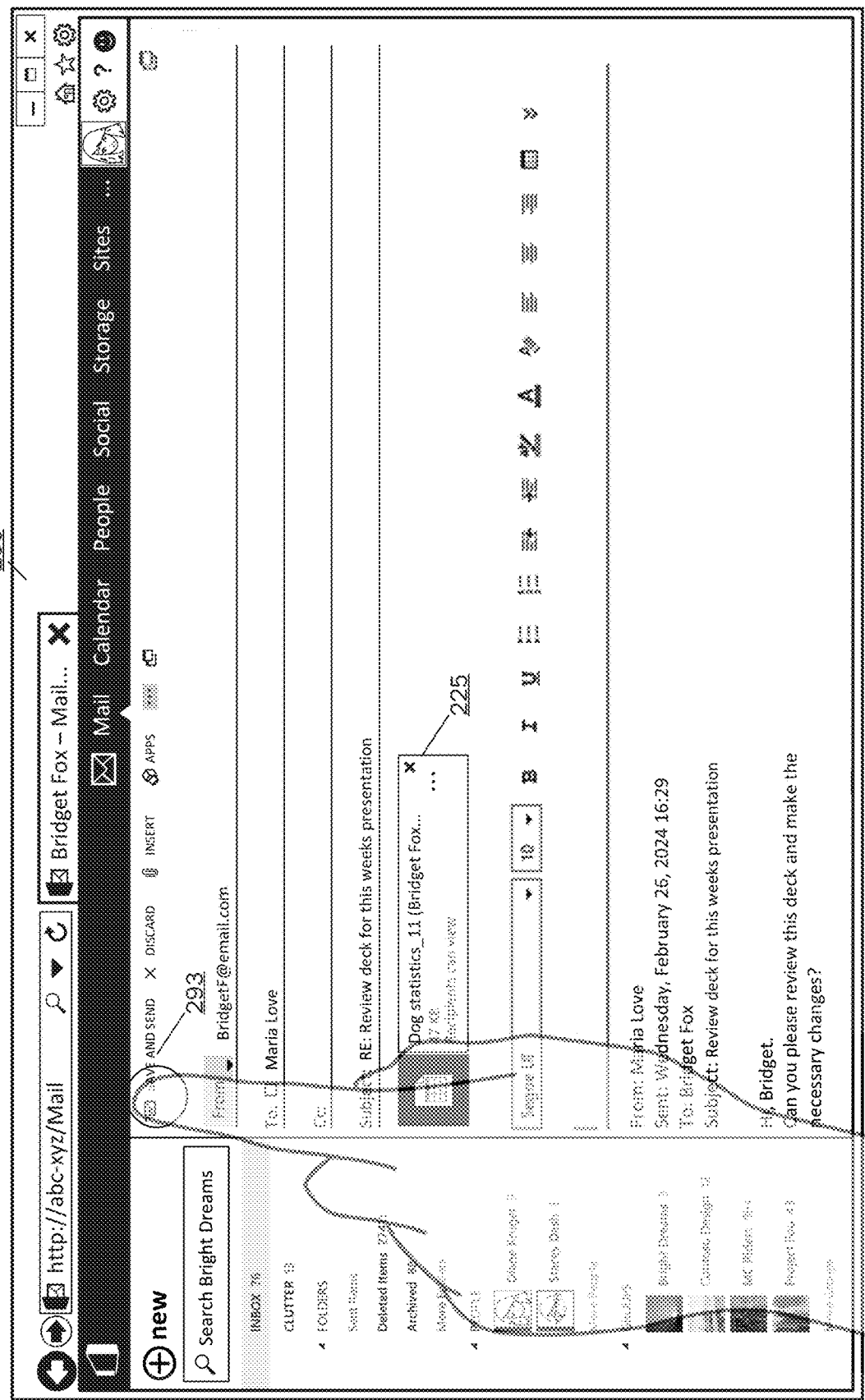
FIG. 2J illustrates a computer-generated electronic mail user interface with which a content item may be sent to one or more desired recipients.

Referring to FIG. 2J, in response to a user selection of the electronic communications function 292 an instance of an associated electronic communications user interface may be automatically launched and provided, as illustrated in FIG. 2J. As illustrated in FIG. 2J, in response to selection of the electronic communication functionality 292 illustrated in FIG. 2I, not only is an instance of the electronic mail user interface launched, but an electronic mail item may be automatically generated, and the document being edited in the example spreadsheet may be automatically attached to the electronic mail item as attachment 225, such that when a user selects a function 293 for disposition of the communication (e.g., sending, forwarding, replying, replaying to all, etc.), then the communication may be sent to a desired user along with an attachment of the edited document or along with a pointer to a location of the stored edited document.

As should be appreciated, while the spreadsheet user interface illustrated in FIG. 2I and the electronic mail user interface illustrated in FIG. 2J are illustrated as displayed apart from other displayed content, the example spreadsheet user interface may be displayed in an immersive view pane, as described above, and the launched electronic communications interface may be displayed in an electronic communications pane, as described above, so that the being-edited document and the launched electronic communications interface are displayed in a side-by-side or top/bottom orientation. Thus, according to this embodiment, a user may launch an electronic communications session out of a document generation/editing session for communicating a given content item to one or more other users.

Referring now to FIG. 2K, according to another embodiment, in addition to displaying and enabling editing of a content item that is attached to an electronic communication, as described above, according to another embodiment, a new content item may be generated out of an electronic communication user interface. As illustrated in FIG. 2K, the electronic mail user interface 200 with its folder pane 210 and electronic mail listing pane 205 and electronic communications pane 215 is illustrated. In addition, an insert function 295 is illustrated for allowing a user to selectively insert objects of various types into an electronic mail item for sending the electronic mail item along with the inserted object to one or more recipients. According to an embodiment, in addition to inserting a given object, for example, an attachment, a photograph, a content item, a document, a data object, and the like, a new file function 296 may be enabled which when selected may allow for the creation of a new content item 294 within the electronic communication user interface 200 that subsequently may be saved and passed to one or more other users via an electronic communication.

Figure 2L:
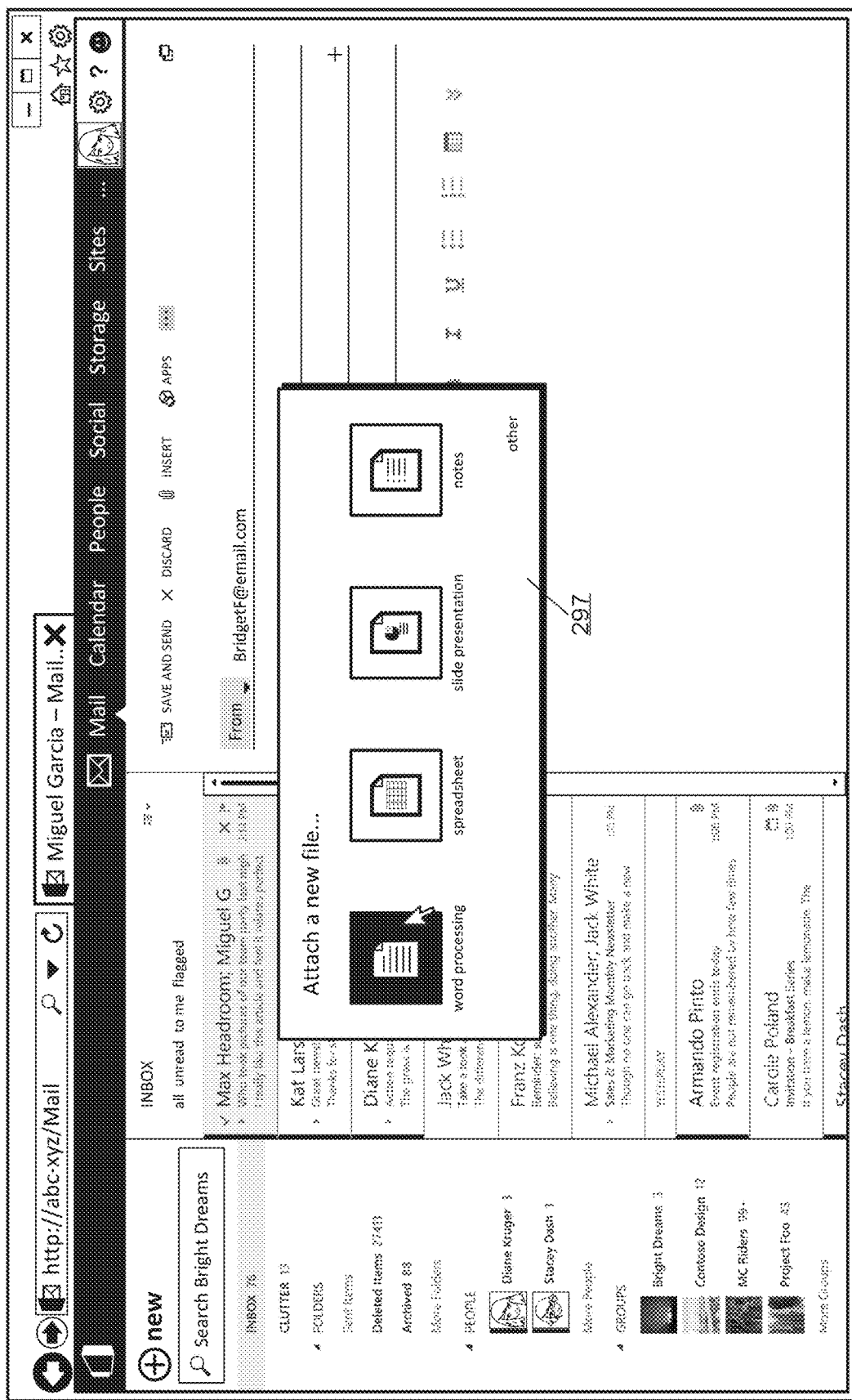
FIG. 2L illustrates a computer-generated electronic communication user interface in which a content item may be created.
Figure 3:
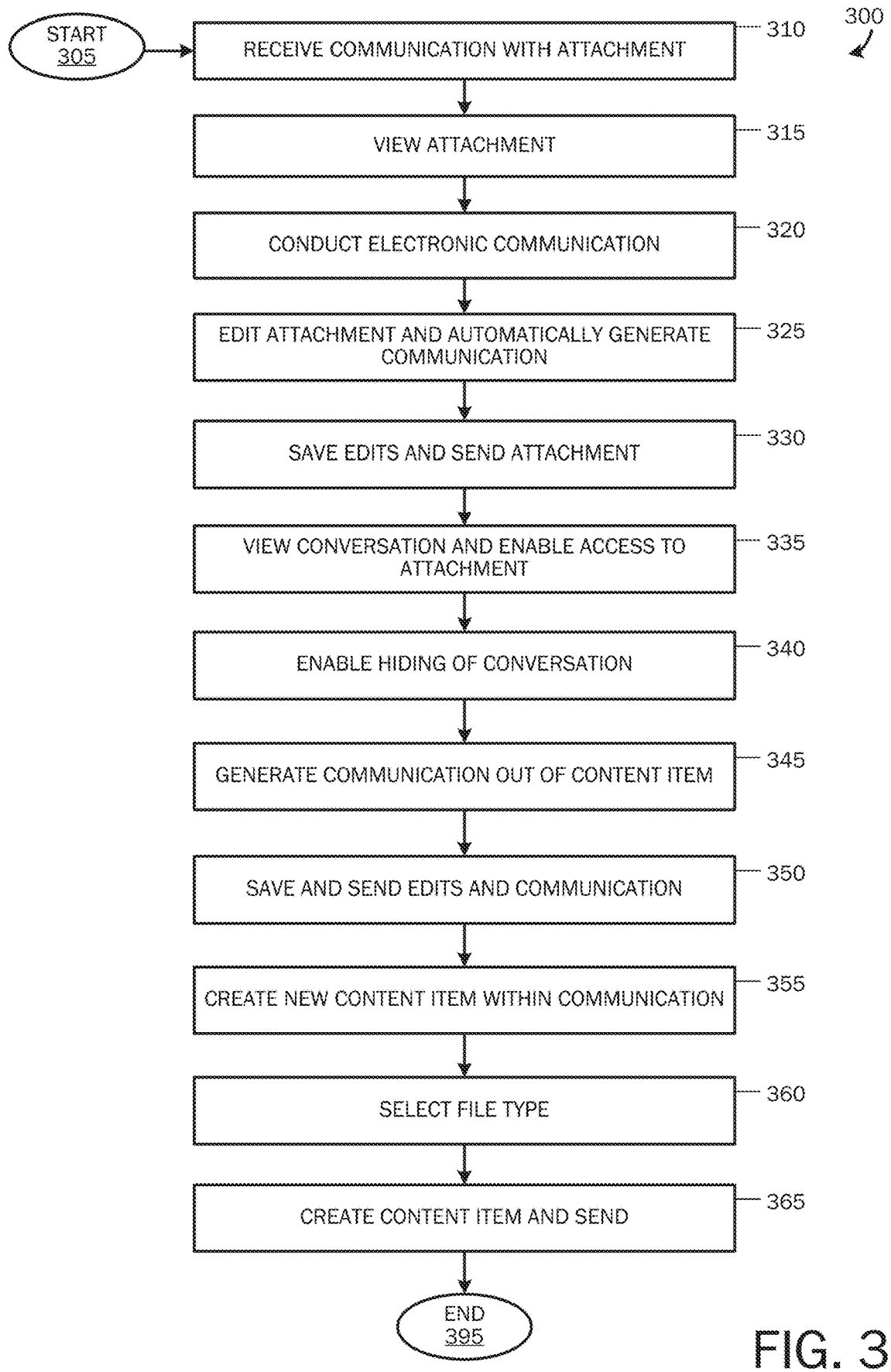
FIG. 3 is a flowchart illustrating a method for inline document collaboration through various workflows.

Referring now to FIG. 2L, in response to selecting the "new file" function 296, as illustrated in FIG. 2K, a user interface object 297 may be presented for allowing the user to select a file type associated with the new content item the user desires to create. For example, the user may be allowed to select from a word processing file, a spreadsheet file, a slide presentation file, a notes taking file, a desktop publishing file, a database file, and the like. That is, as should be appreciated, any file type that may be called upon by the electronic communications application for functionality may be used for allowing the user to create a content item of that type.

Referring now to FIG. 2M, in response to selecting the example word processing file type, an instance of a word processing application user interface may be provided in the immersive view pane of the electronic communications user interface 200 for allowing a user to create a document of that type in the immersive view pane. That is, functionality of the selected word processing file type is provided in the immersive view pane and a blank drafting surface 298 is provided for allowing the user to enter content as illustrated in FIG. 2M. According to one embodiment, after the user completes entry of the content, the user may save the generated content to a storage location of the user's choice, or the user may select a "save and send" function 299 for automatically saving the newly-entered content item to an electronic communication item, for example, an electronic mail item to allow the newly-generated content item to be transmitted with the communication item to a desired recipient. For example, as illustrated and described above with reference to FIG. 1, the newly-generated content item may be automatically stored with an electronic mail item 216 at an electronic mail box 108 for subsequent transmission with the electronic mail item 216.

When generation of the new content item is initiated, the electronic mail item 216 may be automatically generated to allow a user to send the newly-generated content item to a desired recipient upon completion of the content item. According to this embodiment, the automatically-generated electronic mail item 216 may be displayed in the electronic communication pane 215, and attachment 216A may be associated with the electronic mail item 216. Upon selection of the "save and send" function 299, the generated document 298A may be automatically stored with the electronic mail item 216 at the electronic mail box 108, and the attachment 216A may be updated to point to the storage location of the stored document 298A such that a subsequent recipient of the electronic mail item 216 may select the attachment for opening, viewing and editing, if desired the newly-generated document 298A.

Having described the system architecture, various user interface components and various aspects and embodiments of the present invention with respect to FIGS. 1 through 2M, FIG. 3 is a flowchart illustrating a method for inline document collaboration through various workflows. The routine 300 begins as operation 305 and then proceeds to operation 310 where a user receives an electronic communication with an attached content item. For example, the user may receive an electronic mail, instant message, text message, chat message, or the like, having an attached content item. At operation 315, user may view the attached content item in an immersive view to allow the user to view the attached content item and his/her electronic communications pane showing various electronic communication items simultaneously. At operation 320, the user may conduct an electronic communications conversation apart from the display of the selected content item, as illustrated and described above with reference to FIG. 2C.

At operation 325, if the user desires to edit the attached and displayed content item, the user may enter an edit mode wherein functionality associated with the content item will be provided. In response to entering the edit mode, an electronic communication may be automatically generated for allowing the user to subsequently send an edited version of the content item to one or more desired recipients. At operation 330, in response to selection of a function for saving edits to the content item and for sending the edited content item to one or more desired recipients, the edited content item may be stored with the electronic mail item in an electronic mail server 108, or the edited content item may be automatically stored in a separate storage location, for example, the collaboration server 112.

At operation 335, when the electronic communication is sent to the desired recipients, the edited content item may be attached to the communication if it is been saved with the email, or a pointer to the saved content item may be attached to the communication to point the recipient of the communication to a storage location for the edited content item. At operation 340, after the automatically-generated communication is sent, the user's electronic communications user interface 200 may return back to a starting configuration, and the user may view a communication conversation including a communication associated with the sent edited content item. At operation 340, hiding an electronic communication may be enabled, if desired.

At operation 345, if a user desires to generate an electronic communication out of a user interface associated with the generation of a given content item, the user may select an electronic communications function from a user interface provided by the associated software application, for example, a word processing application user interface, a spreadsheet application user interface, a slide presentation application user interface, and the like, and at operation 350, a "save and send" function may be utilized for saving edits to an associated content item and for sending a generated and/or edit content item to one or more desired recipients, as illustrated and described above with reference to FIGS. 2I and 2J.

At operation 355, if a user utilizing his/her electronic communications application and user interface 200 desires to create a new content item, the user may select to insert a new content item within an electronic communication, as illustrated above with reference to FIG. 2K. At operation 360, an appropriate file type may be selected, and an instance of an associated software application user interface, for example, a word processing application user interface, may be provided in the immersive view pane for allowing the user to generate a new content item of the desired file type.

At operation 365, the content item of the selected file type may be generated. The generated content item may be saved a desired storage location, or if desired, the user may utilize a "save and send" function for saving the generated document with an automatically-generated electronic communication item and for sending the electronic communication item to a desired recipient by attaching the newly-generated content item to the automatically-generated electronic communication item. The routine ends at operation 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
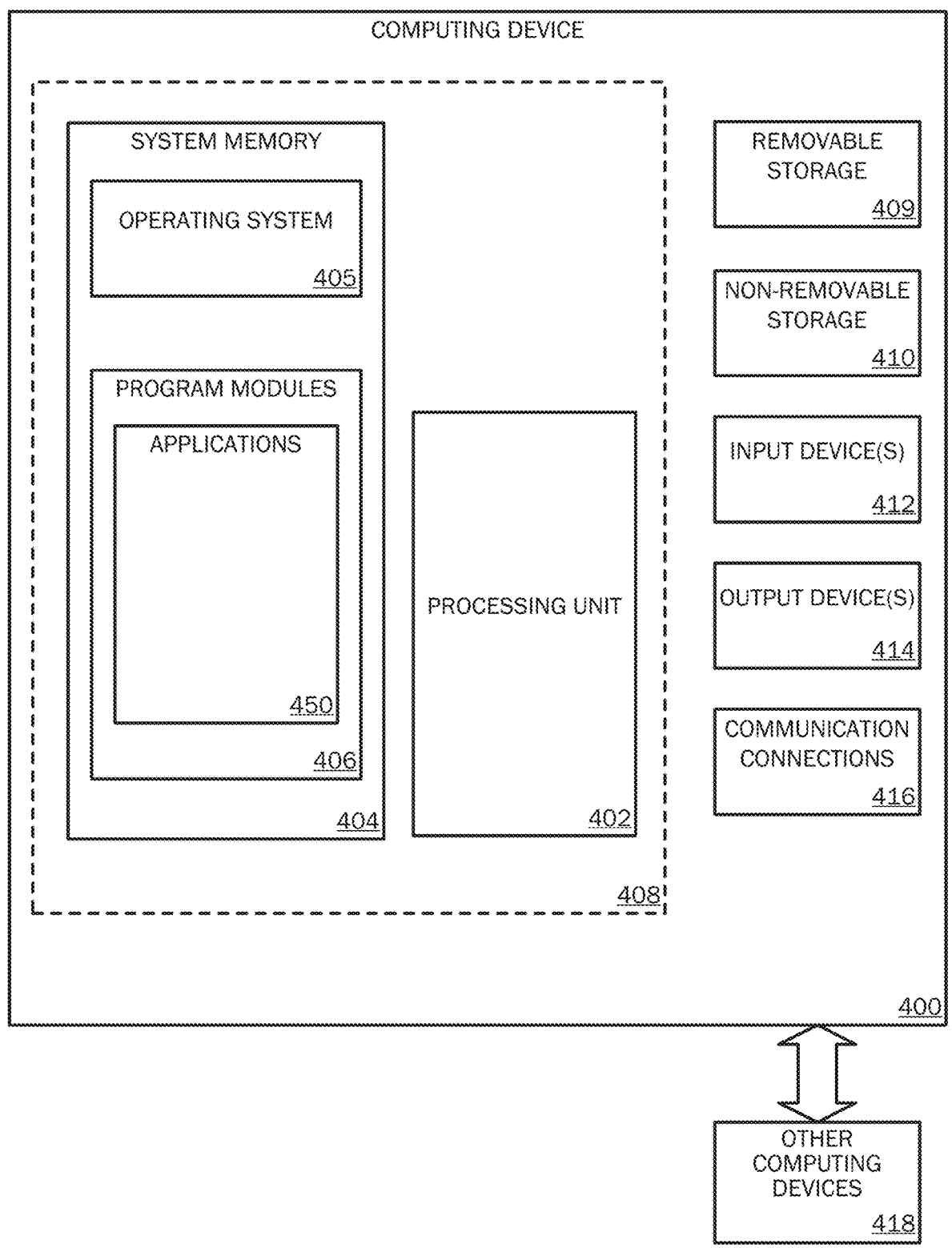
FIG. 4 is a block diagram illustrating example physical components of a computing device with which embodiments of the invention may be practiced.
Figure 5A:
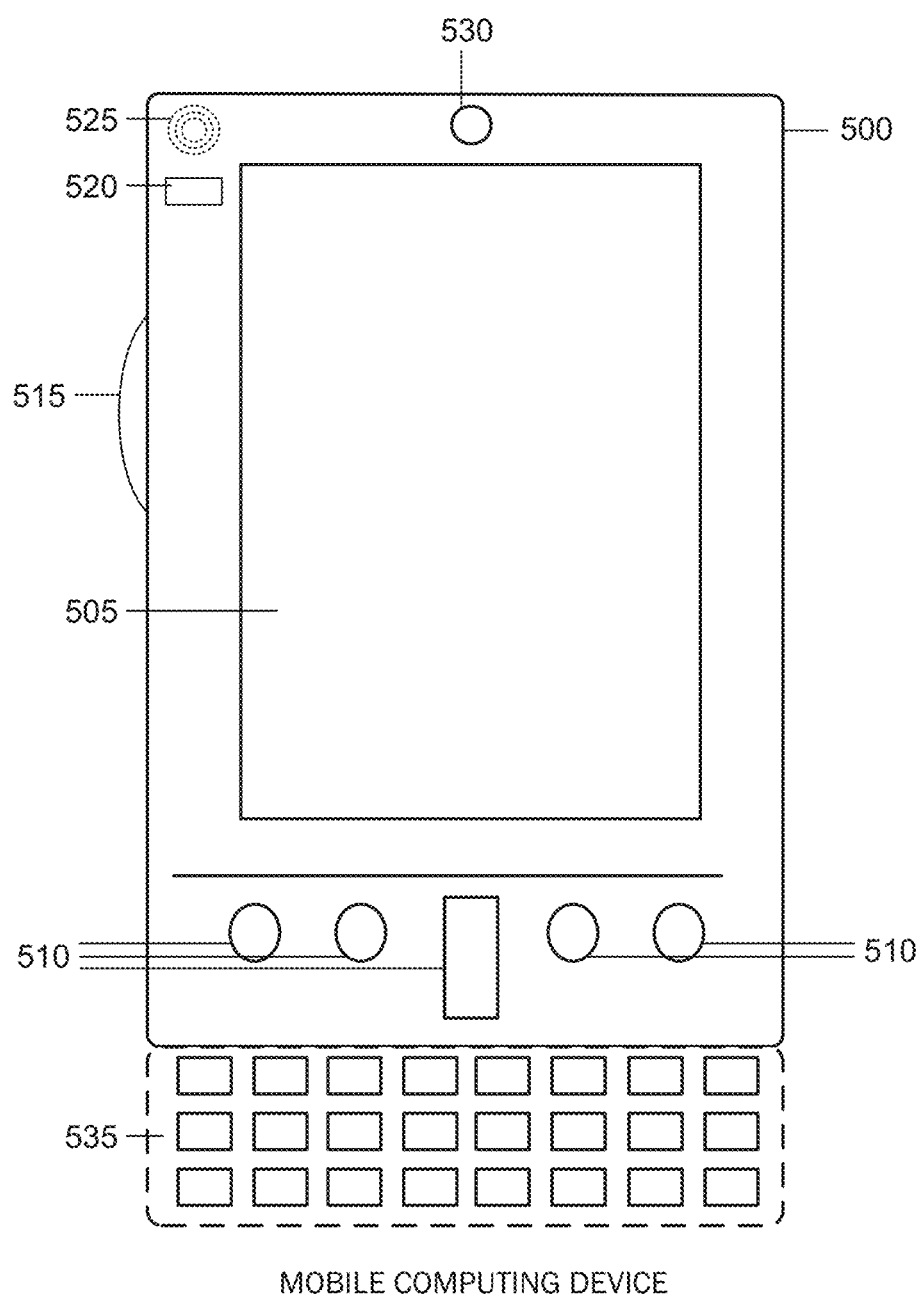
FIGS. 5A and 5B are simplified block diagrams of a mobile computing device with which embodiments of the present invention may be practiced.
Figure 5B:
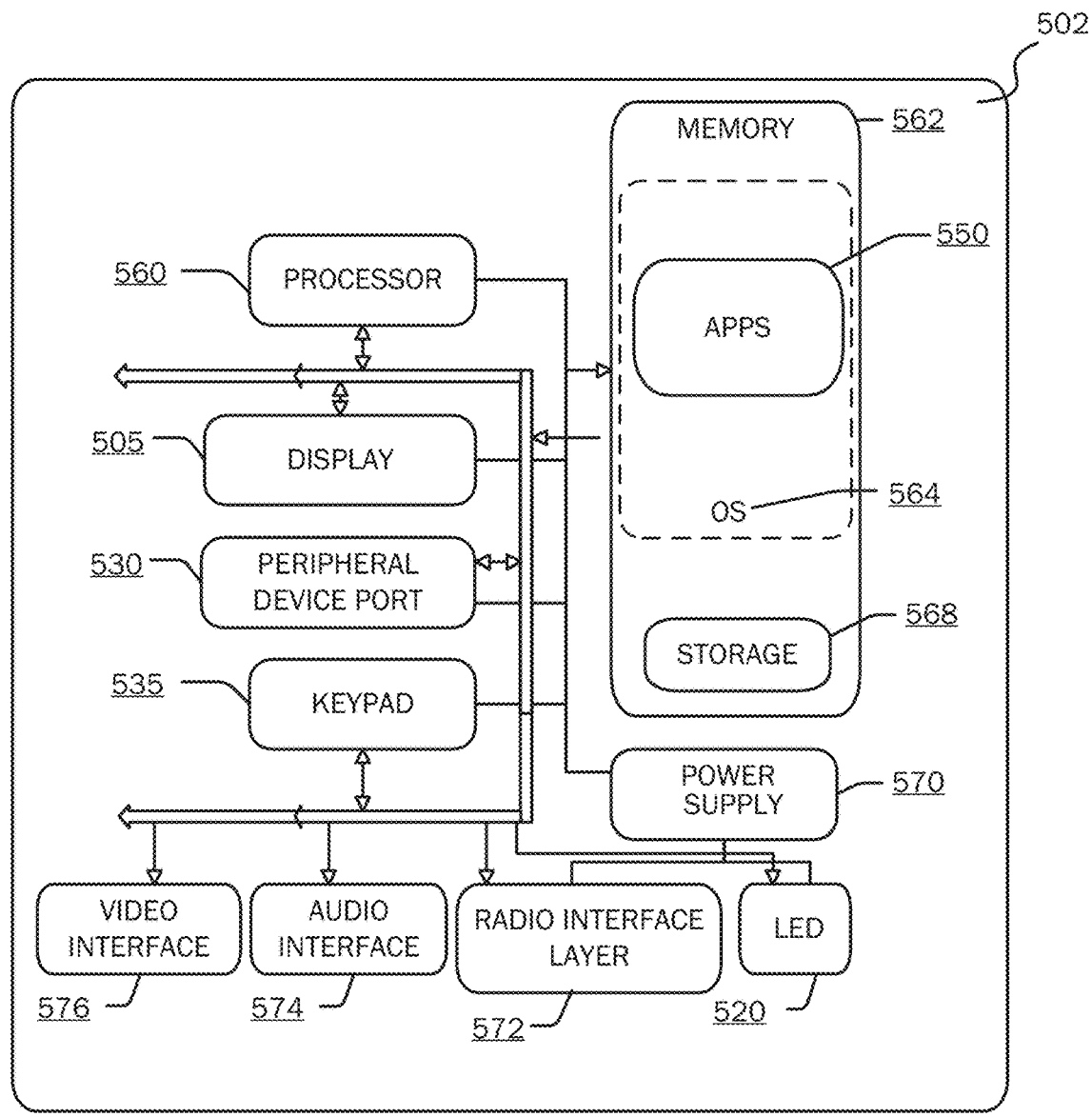
Figure 6:
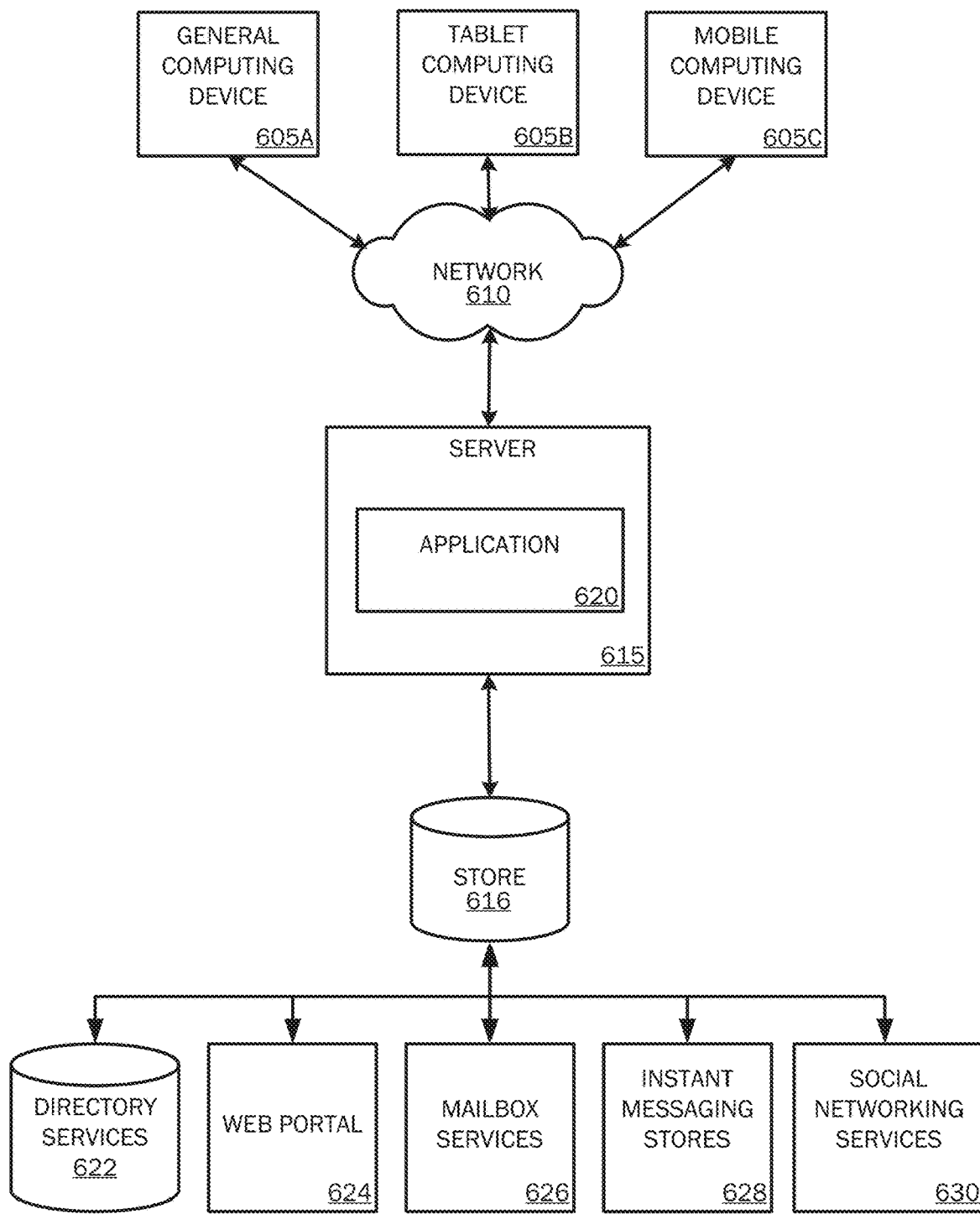
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 104A-N described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, electronic communication applications, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing the functionality described herein across components of a distributed computing environment. Content developed, interacted with, or edited in association with the applications described above may be stored in different communication channels or other storage types. For example, various documents may be stored using a directory service 622, a web portal 624, a mailbox service 626, an instant messaging store 628, or a social networking site 630. The application 620 (e.g., an electronic communication application) may use any of these types of systems or the like for providing the functionalities described herein across multiple workloads, as described herein. A server 615, 108 may provide the functionality to clients 605A-C and 104A-N. As one example, the server 615, 108 may be a web server providing the application functionality described herein over the web. The server 615, 108 may provide the application functionality over the web to clients 605A-C and 104A-N through a network 120, 610. By way of example, a client computing device 104A-N may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method of generating a content item out of an electronic communication workflow, comprising:
   providing for display an electronic communication user interface (UI), the electronic communication UI comprising an electronic communication view pane displaying an electronic communication and including a selectable option to insert an item into the electronic communication;
   receiving a selection of the selectable option via the electronic communication view pane to insert the item;
   in response to the selection of the selectable option to insert the item, providing for display, within the electronic communication view pane, a first menu of one or more types of items to insert into the electronic communication, wherein the first menu includes a plurality of selectable options that include:
      a selectable option to create a new file for insertion into the electronic communication; and
      a selectable option to insert an attachment into the electronic communication;
   receiving, via the provided first menu of the electronic communication view pane, a selection of the selectable option to create the new file;
   in response to the selection of the selectable option to create the new file, providing for display, a second menu of a plurality of selectable applications usable to create new content in an immersive view pane of the electronic communication UI for the new file;
   receiving, via the provided second menu of the electronic communication view pane, a selection of one of the plurality of selectable applications; and
   in response to receiving the selection of the one of the plurality of selectable applications, providing an instance of an application user interface of the selected one of the plurality of selectable applications in the immersive view pane of the electronic communication UI for co-display with the electronic communication in the electronic communication view pane, the application user interface displaying the new content of the new file in the immersive view pane of the electronic communication UI.

2. The method of claim 1, the method further comprising:
   providing for display, within the electronic communication view pane of the electronic communication UI, a content item that is attached to the electronic communication and one or more selectable response options for replying to the electronic communication;
   receiving a selection of one of the one or more selectable response options for replying to the electronic communication; and
   in response to the receipt of the selection of the one selectable response option, generating and displaying, within the electronic communication view pane, a new electronic communication corresponding to the one selectable response option.

3. The method of claim 2, further comprising receiving a selection of the content item and opening the content item within the immersive view pane of the electronic communication UI, wherein the one selectable response option includes responding with an edited copy of the content item, wherein the editing of the content item occurred in the immersive view pane and wherein the edited copy of the content item is attached to the new electronic communication.

4. The method of claim 3, wherein the one selectable response option comprises responding to the electronic communication with changes to the content item.

5. The method of claim 2, the method further comprising:
   in response to receipt of the selection of the one selectable response option:
      displaying, within the electronic communication view pane, one or more selectable disposition options.

6. The method of claim 5, wherein the one or more selectable disposition options are distinct from the one or more selectable response options, and wherein the one or more selectable response options remain hidden while the one or more selectable disposition options are displayed.

7. The method of claim 6, the method further comprising, in response to receipt of a selection of a disposition option from the one or more selectable disposition options, closing the electronic communication view pane.

8. The method of claim 6, wherein the one or more selectable disposition options include at least a send option and a discard option.

9. The method of claim 2, wherein the one selectable response option is selected from response options comprising: a reply with changes option, a forwarding option, a sending option, a send as an attachment option, and a forward as attachment option.

10. The method of claim 1, further comprising:
    enabling concurrent editing of the new file within the immersive view pane and the electronic communication within the electronic communication view pane as they are co-displayed within the electronic communication user interface.

11. The method of claim 1, further comprising:
    before sending the electronic communication and upon creation of the new file including the new content displayed within the immersive view pane, causing a display of the new file as an attachment to the electronic communication within the electronic communication view pane with the new content of the new file displayed within the immersive view pane;
receiving a selection of a send option displayed within the electronic communication view pane; and
transmitting the electronic communication with the new file attached;
receiving a selection of a send option displayed within the electronic communication view pane; and
transmitting the electronic communication with the new file attached.

12. A system for generating a content item out of an electronic communication workflow, the system comprising:
a memory device storing executable instructions;
a processing device executing the executable instructions, wherein the executed instructions cause the processing device to:
provide for display, within an electronic communication view pane of an electronic communication user interface (UI), an electronic communication and a selectable option to insert an item into the electronic communication;
receive a selection of the selectable option via the electronic communication view pane to insert the item;
in response to the selection of the selectable option to insert the item, provide for display, within the electronic communication view pane, a first menu of one or more types of items to insert into the electronic communication, wherein the first menu includes a plurality of selectable options that include:
a selectable option to create a new file for insertion into the electronic communication; and
a selectable option to insert an attachment into the electronic communication;
receive, via the provided first menu of the electronic communication view pane, a selection of the selectable option to create the new file;
in response to the selection of the selectable option to create the new file, provide for display, a second menu of a plurality of selectable applications usable to create new content in an immersive view pane of the electronic communication UI for the new file;
receive, via the provided second menu of the electronic communication view pane, a selection of one of the plurality of selectable applications; and
in response to receiving the selection of the one of the plurality of selectable applications, provide an instance of an application user interface of the selected one of the plurality of selectable applications in the immersive view pane of the electronic communication UI for co-display with the electronic communication in the electronic communication view pane, the application user interface displays the new content of the new file in the immersive view pane of the electronic communication UI.

13. The system of claim 12, the processing device further caused to:
provide for display, within the electronic communication view pane of the electronic communication UI, a content item that is attached to the electronic communication and one or more selectable response options for replying to the electronic communication;
receive a selection of one of the one or more selectable response options for replying to the electronic communication; and
in response to the receipt of the selection of the one selectable response option, generate and provide for display, within the electronic communication view pane, a new electronic communication corresponding to the one selectable response option.

14. The system of claim 13, wherein the processing device is further caused to receive a selection of the content item and open the content item within the immersive view pane of the electronic communication UI, wherein the one selectable response option includes responding with an edited copy of the content item, wherein the editing of the content item occurred in the immersive view pane, and wherein the edited copy of the content item is attached to the new electronic communication.

15. The system of claim 13, the processing device further caused to:
in response to receipt of the selection of the one selectable response option:
provide for display, in the electronic communication view pane of the electronic communication UI, one or more selectable disposition options.

16. The system of claim 15, wherein the one or more selectable disposition options are distinct from the one or more selectable response options, and wherein the one or more selectable response options remain hidden while the one or more selectable disposition options are displayed.

17. The system of claim 16, the processing device further caused to,
in response to receipt of a selection of a disposition option from the one or more selectable disposition options, close the electronic communication view pane.

18. The system of claim 16, wherein the one or more selectable disposition options include at least a send option and a discard option.

19. The system of claim 13, wherein the one selectable response option is selected from response options comprising: a reply with changes option, a forwarding option, a sending option, a send as an attachment option, and a forward as attachment option.

20. Computer storage media storing instructions that are executable by a computing device, wherein the instructions direct the computing device to:
provide for display, within an electronic communication view pane of an electronic communication user interface (UI), an electronic communication and a selectable option to insert an item into the electronic communication;
receive a selection of the selectable option via the electronic communication view pane to insert the item;
in response to the selection of the selectable option to insert the item, provide for display, within the electronic communication view pane, a first menu of one or more types of items to insert into the electronic communication, wherein the first menu includes a plurality of selectable options that include:
a selectable option to create a new file for insertion into the electronic communication; and
a selectable option to insert an attachment into the electronic communication;
receive, via the provided first menu of the electronic communication view pane, a selection of the selectable option to create the new file;
in response to the selection of the selectable option to create the new file, provide for display, a second menu of a plurality of selectable applications usable to create new content in an immersive view pane of the electronic communication UI for the new file;

receive, via the provided second menu of the electronic communication view pane, a selection of one of the plurality of selectable applications;

in response to receiving the selection of the one of the plurality of selectable applications, provide an instance of an application user interface of the selected one of the plurality of selectable applications in the immersive view pane of the electronic communication UI for co-display with the electronic communication in the electronic communication view pane, the application user interface displays the new content of the new file in the immersive view pane of the electronic communication UI; and before sending the electronic communication and upon creation of the new file including the new content displayed within the immersive view pane, cause a display of the new file as an attachment to the electronic communication within the electronic communication view pane with the new content of the new file displayed within the immersive view pane.

* * * * *